(12) United States Patent
Liess

(10) Patent No.: US 10,443,326 B2
(45) Date of Patent: Oct. 15, 2019

(54) COMBINED MULTI-COUPLER

(71) Applicant: Weatherford Technology Holdings, LLC, Houston, TX (US)

(72) Inventor: Martin Liess, Seelze (DE)

(73) Assignee: WEATHERFORD TECHNOLOGY HOLDINGS, LLC, Houston, TX (US)

(*) Notice: Subject to any disclaimer, the term of this patent is extended or adjusted under 35 U.S.C. 154(b) by 116 days.

(21) Appl. No.: 15/656,684

(22) Filed: Jul. 21, 2017

(65) Prior Publication Data

US 2018/0258717 A1 Sep. 13, 2018

Related U.S. Application Data

(60) Provisional application No. 62/469,431, filed on Mar. 9, 2017.

(51) Int. Cl.
| | | |
|---|---|---|
| *E21B 17/046* | (2006.01) | |
| *E21B 19/16* | (2006.01) | |
| *E21B 3/02* | (2006.01) | |
| *E21B 17/02* | (2006.01) | |

(52) U.S. Cl.
CPC ........ *E21B 19/16* (2013.01); *E21B 3/02* (2013.01); *E21B 17/028* (2013.01); *E21B 17/046* (2013.01)

(58) Field of Classification Search
CPC .......... E21B 17/02; E21B 17/046; E21B 3/02
See application file for complete search history.

(56) References Cited

U.S. PATENT DOCUMENTS

| | | |
|---|---|---|
| 1,367,156 A | 2/1921 | McAlvay et al. |
| 1,610,977 A | 12/1926 | Scott |
| 1,822,444 A | 9/1931 | MacClatchie |
| 2,370,354 A | 2/1945 | Hurst |
| 3,147,992 A | 9/1964 | Haeber et al. |
| 3,354,951 A | 11/1967 | Savage et al. |
| 3,385,370 A | 5/1968 | Knox et al. |
| 3,662,842 A | 5/1972 | Bromell |
| 3,698,426 A | 10/1972 | Litchfield et al. |
| 3,747,675 A | 7/1973 | Brown |
| 3,766,991 A | 10/1973 | Brown |
| 3,774,697 A | 11/1973 | Brown |

(Continued)

FOREIGN PATENT DOCUMENTS

| | | |
|---|---|---|
| AU | 2012201644 A1 | 4/2012 |
| AU | 2013205714 A1 | 5/2013 |

(Continued)

OTHER PUBLICATIONS

A123 System; 14Ah Prismatic Pouch Cell; Nanophosphate® Lithium-Ion; www.a123systems.com; date unknown; 1 page.

(Continued)

*Primary Examiner* — Kenneth L Thompson
(74) *Attorney, Agent, or Firm* — Patterson + Sheridan, LLP

(57) ABSTRACT

Embodiments of the present disclosure provide combined multi-coupler assembly for quickly connecting a top drive to a tool. The combined multi-coupler assembly includes a drive stem and a tool dock that may be coupled to each other. When the drive stem and the tool dock are connected, axial loads, torsional loads, and hydraulic, pneumatic, electrical, optical, or other types of communications may be transferred between the drive stem and the tool dock.

20 Claims, 17 Drawing Sheets

(56) References Cited

U.S. PATENT DOCUMENTS

| | | |
|---|---|---|
| 3,776,320 A | 12/1973 | Brown |
| 3,842,619 A | 10/1974 | Bychurch, Sr. |
| 3,888,318 A | 6/1975 | Brown |
| 3,899,024 A | 8/1975 | Tonnelli et al. |
| 3,913,687 A | 10/1975 | Gyongyosi et al. |
| 3,915,244 A | 10/1975 | Brown |
| 3,964,552 A | 6/1976 | Slator |
| 4,022,284 A | 5/1977 | Crow |
| 4,051,587 A | 10/1977 | Boyadjieff |
| 4,100,968 A | 7/1978 | Delano |
| 4,192,155 A | 3/1980 | Gray |
| 4,199,847 A | 4/1980 | Owens |
| 4,235,469 A | 11/1980 | Denny et al. |
| 4,364,407 A | 12/1982 | Hilliard |
| 4,377,179 A | 3/1983 | Giebeler |
| 4,402,239 A | 9/1983 | Mooney |
| 4,449,596 A | 5/1984 | Boyadjieff |
| 4,478,244 A | 10/1984 | Garrett |
| 4,497,224 A | 2/1985 | Jürgens |
| 4,593,773 A | 6/1986 | Skeie |
| 4,762,187 A | 8/1988 | Haney |
| 4,776,617 A | 10/1988 | Sato |
| 4,779,688 A | 10/1988 | Baugh |
| 4,791,997 A | 12/1988 | Krasnov |
| 4,813,493 A | 3/1989 | Shaw et al. |
| 4,815,546 A | 3/1989 | Haney et al. |
| 4,821,814 A | 4/1989 | Willis et al. |
| 4,844,181 A | 7/1989 | Bassinger |
| 4,867,236 A | 9/1989 | Haney et al. |
| 4,955,949 A | 9/1990 | Bailey et al. |
| 4,962,819 A | 10/1990 | Bailey et al. |
| 4,972,741 A | 11/1990 | Sibille |
| 4,981,180 A | 1/1991 | Price |
| 4,997,042 A | 3/1991 | Jordan et al. |
| 5,036,927 A | 8/1991 | Willis |
| 5,099,725 A | 3/1992 | Bouligny, Jr. et al. |
| 5,152,554 A | 10/1992 | LaFleur et al. |
| 5,172,940 A | 12/1992 | Usui et al. |
| 5,191,939 A | 3/1993 | Stokley |
| 5,215,153 A | 6/1993 | Younes |
| 5,245,877 A | 9/1993 | Ruark |
| 5,282,653 A | 2/1994 | LaFleur et al. |
| 5,297,833 A | 3/1994 | Willis et al. |
| 5,348,351 A | 9/1994 | LaFleur et al. |
| 5,385,514 A | 1/1995 | Dawe |
| 5,433,279 A | 7/1995 | Tessari et al. |
| 5,441,310 A | 8/1995 | Barrett et al. |
| 5,456,320 A | 10/1995 | Baker |
| 5,479,988 A | 1/1996 | Appleton |
| 5,486,223 A | 1/1996 | Carden |
| 5,501,280 A | 3/1996 | Brisco |
| 5,509,442 A | 4/1996 | Claycomb |
| 5,577,566 A | 11/1996 | Albright et al. |
| 5,584,343 A | 12/1996 | Coone |
| 5,645,131 A | 7/1997 | Trevisani |
| 5,664,310 A | 9/1997 | Penisson |
| 5,682,952 A | 11/1997 | Stokley |
| 5,735,348 A | 4/1998 | Hawkins, III |
| 5,778,742 A | 7/1998 | Stuart |
| 5,839,330 A | 11/1998 | Stokka |
| 5,909,768 A | 6/1999 | Castille et al. |
| 5,918,673 A | 7/1999 | Hawkins et al. |
| 5,950,724 A | 9/1999 | Giebeler |
| 5,971,079 A | 10/1999 | Mullins |
| 5,992,520 A | 11/1999 | Schultz et al. |
| 6,003,412 A | 12/1999 | Dlask et al. |
| 6,053,191 A | 4/2000 | Hussey |
| 6,102,116 A | 8/2000 | Giovanni |
| 6,142,545 A | 11/2000 | Penman et al. |
| 6,161,617 A | 12/2000 | Gjedebo |
| 6,173,777 B1 | 1/2001 | Mullins |
| 6,276,450 B1 | 8/2001 | Seneviratne |
| 6,279,654 B1 | 8/2001 | Mosing et al. |
| 6,289,911 B1 | 9/2001 | Majkovic |
| 6,309,002 B1 | 10/2001 | Bouligny |
| 6,311,792 B1 | 11/2001 | Scott et al. |
| 6,328,343 B1 | 12/2001 | Hosie et al. |
| 6,378,630 B1 | 4/2002 | Ritorto et al. |
| 6,390,190 B2 | 5/2002 | Mullins |
| 6,401,811 B1 | 6/2002 | Coone |
| 6,415,862 B1 | 7/2002 | Mullins |
| 6,431,626 B1 | 8/2002 | Bouligny |
| 6,443,241 B1 | 9/2002 | Juhasz et al. |
| 6,460,620 B1 | 10/2002 | LaFleur |
| 6,527,047 B1 | 3/2003 | Pietras |
| 6,536,520 B1 | 3/2003 | Snider et al. |
| 6,571,876 B2 | 6/2003 | Szarka |
| 6,578,632 B2 | 6/2003 | Mullins |
| 6,595,288 B2 | 7/2003 | Mosing et al. |
| 6,604,578 B2 | 8/2003 | Mullins |
| 6,622,796 B1 | 9/2003 | Pietras |
| 6,637,526 B2 | 10/2003 | Juhasz et al. |
| 6,640,824 B2 | 11/2003 | Majkovic |
| 6,666,273 B2 | 12/2003 | Laurel |
| 6,675,889 B1 | 1/2004 | Mullins et al. |
| 6,679,333 B2 | 1/2004 | York et al. |
| 6,688,398 B2 | 2/2004 | Pietras |
| 6,691,801 B2 | 2/2004 | Juhasz et al. |
| 6,705,405 B1 | 3/2004 | Pietras |
| 6,715,542 B2 | 4/2004 | Mullins |
| 6,719,046 B2 | 4/2004 | Mullins |
| 6,722,425 B2 | 4/2004 | Mullins |
| 6,725,938 B1 | 4/2004 | Pietras |
| 6,732,819 B2 | 5/2004 | Wenzel |
| 6,732,822 B2 | 5/2004 | Slack et al. |
| 6,742,584 B1 | 6/2004 | Appleton |
| 6,742,596 B2 | 6/2004 | Haugen |
| 6,779,599 B2 | 8/2004 | Mullins et al. |
| 6,832,656 B2 | 12/2004 | Fournier, Jr. et al. |
| 6,883,605 B2 | 4/2005 | Arceneaux et al. |
| 6,892,835 B2 | 5/2005 | Shahin et al. |
| 6,908,121 B2 | 6/2005 | Hirth et al. |
| 6,925,807 B2 | 8/2005 | Jones et al. |
| 6,938,697 B2 | 9/2005 | Haugen |
| 6,976,298 B1 | 12/2005 | Pietras |
| 6,994,176 B2 | 2/2006 | Shahin et al. |
| 7,000,503 B2 | 2/2006 | Dagenais et al. |
| 7,001,065 B2 | 2/2006 | Dishaw et al. |
| 7,004,259 B2 | 2/2006 | Pietras |
| 7,007,753 B2 | 3/2006 | Robichaux et al. |
| 7,017,671 B2 | 3/2006 | Williford |
| 7,021,374 B2 | 4/2006 | Pietras |
| 7,025,130 B2 | 4/2006 | Bailey et al. |
| 7,073,598 B2 | 7/2006 | Haugen |
| 7,090,021 B2 | 8/2006 | Pietras |
| 7,096,948 B2 | 8/2006 | Mosing et al. |
| 7,114,235 B2 | 10/2006 | Jansch et al. |
| 7,128,161 B2 | 10/2006 | Pietras |
| 7,137,454 B2 | 11/2006 | Pietras |
| 7,140,443 B2 | 11/2006 | Beierbach et al. |
| 7,143,849 B2 | 12/2006 | Shahin et al. |
| 7,147,254 B2 | 12/2006 | Niven et al. |
| 7,159,654 B2 | 1/2007 | Ellison et al. |
| 7,178,612 B2 | 2/2007 | Belik |
| 7,213,656 B2 | 5/2007 | Pietras |
| 7,219,744 B2 | 5/2007 | Pietras |
| 7,231,969 B2 | 6/2007 | Folk et al. |
| 7,270,189 B2 | 9/2007 | Brown et al. |
| 7,281,451 B2 | 10/2007 | Schulze Beckinghausen |
| 7,281,587 B2 | 10/2007 | Haugen |
| 7,303,022 B2 | 12/2007 | Tilton et al. |
| 7,325,610 B2 | 2/2008 | Giroux et al. |
| 7,353,880 B2 | 4/2008 | Pietras |
| 7,448,456 B2 | 11/2008 | Shahin et al. |
| 7,451,826 B2 | 11/2008 | Pietras |
| 7,490,677 B2 | 2/2009 | Buytaert et al. |
| 7,503,397 B2 | 3/2009 | Giroux et al. |
| 7,509,722 B2 | 3/2009 | Shahin et al. |
| 7,513,300 B2 | 4/2009 | Pietras et al. |
| 7,591,304 B2 | 9/2009 | Juhasz et al. |
| 7,617,866 B2 | 11/2009 | Pietras |
| 7,635,026 B2 | 12/2009 | Mosing et al. |
| 7,665,515 B2 | 2/2010 | Mullins |
| 7,665,530 B2 | 2/2010 | Wells et al. |

(56) References Cited

U.S. PATENT DOCUMENTS

| | | |
|---|---|---|
| 7,665,531 B2 | 2/2010 | Pietras |
| 7,669,662 B2 | 3/2010 | Pietras |
| 7,690,422 B2 | 4/2010 | Swietlik et al. |
| 7,694,730 B2 | 4/2010 | Angman |
| 7,694,744 B2 | 4/2010 | Shahin |
| 7,699,121 B2 | 4/2010 | Juhasz et al. |
| 7,712,523 B2 | 5/2010 | Snider et al. |
| 7,730,698 B1 | 6/2010 | Montano et al. |
| 7,757,759 B2 | 7/2010 | Jahn et al. |
| 7,779,922 B1 | 8/2010 | Harris et al. |
| 7,793,719 B2 | 9/2010 | Snider et al. |
| 7,817,062 B1 | 10/2010 | Li et al. |
| 7,828,085 B2 | 11/2010 | Kuttel et al. |
| 7,841,415 B2 | 11/2010 | Winter |
| 7,854,265 B2 | 12/2010 | Zimmermann |
| 7,866,390 B2 | 1/2011 | Latiolais, Jr. et al. |
| 7,874,352 B2 | 1/2011 | Odell, II et al. |
| 7,874,361 B2 | 1/2011 | Mosing et al. |
| 7,878,237 B2 | 2/2011 | Angman |
| 7,878,254 B2 | 2/2011 | Abdollahi et al. |
| 7,882,902 B2 | 2/2011 | Boutwell, Jr. |
| 7,896,084 B2 | 3/2011 | Haugen |
| 7,918,273 B2 | 4/2011 | Snider et al. |
| 7,958,787 B2 | 6/2011 | Hunter |
| 7,971,637 B2 | 7/2011 | Duhon et al. |
| 7,975,768 B2 | 7/2011 | Fraser et al. |
| 8,118,106 B2 | 2/2012 | Wiens et al. |
| 8,141,642 B2 | 3/2012 | Olstad et al. |
| 8,210,268 B2 | 7/2012 | Heidecke et al. |
| 8,281,856 B2 | 10/2012 | Jahn et al. |
| 8,307,903 B2 | 11/2012 | Redlinger et al. |
| 8,365,834 B2 | 2/2013 | Liess et al. |
| 8,459,361 B2 | 6/2013 | Leuchtenberg |
| 8,505,984 B2 | 8/2013 | Henderson et al. |
| 8,567,512 B2 | 10/2013 | Odell, II et al. |
| 8,601,910 B2 | 12/2013 | Begnaud |
| 8,636,067 B2 | 1/2014 | Robichaux et al. |
| 8,651,175 B2 | 2/2014 | Fallen |
| 8,668,003 B2 | 3/2014 | Osmundsen et al. |
| 8,708,055 B2 | 4/2014 | Liess et al. |
| 8,727,021 B2 | 5/2014 | Heidecke et al. |
| 8,776,898 B2 | 7/2014 | Liess et al. |
| 8,783,339 B2 | 7/2014 | Sinclair et al. |
| 8,839,884 B2 | 9/2014 | Kuttel et al. |
| 8,893,772 B2 | 11/2014 | Henderson et al. |
| 9,068,406 B2 | 6/2015 | Clasen et al. |
| 9,206,851 B2 | 12/2015 | Slaughter, Jr. et al. |
| 9,527,139 B2 * | 12/2016 | Mellstrom ............... B23B 31/24 |
| 9,528,326 B2 | 12/2016 | Heidecke et al. |
| 9,631,438 B2 | 4/2017 | McKay |
| 2002/0043403 A1 | 4/2002 | Juhasz et al. |
| 2002/0074132 A1 | 6/2002 | Juhasz et al. |
| 2002/0084069 A1 | 7/2002 | Mosing et al. |
| 2002/0129934 A1 | 9/2002 | Mullins et al. |
| 2002/0170720 A1 | 11/2002 | Haugen |
| 2003/0098150 A1 | 5/2003 | Andreychuk |
| 2003/0107260 A1 | 6/2003 | Ording et al. |
| 2003/0221519 A1 | 12/2003 | Haugen |
| 2004/0003490 A1 | 1/2004 | Shahin et al. |
| 2004/0069497 A1 | 4/2004 | Jones et al. |
| 2004/0216924 A1 | 11/2004 | Pietras et al. |
| 2005/0000691 A1 | 1/2005 | Giroux et al. |
| 2005/0173154 A1 | 8/2005 | Lesko |
| 2005/0206163 A1 | 9/2005 | Guesnon et al. |
| 2005/0257933 A1 | 11/2005 | Pietras |
| 2005/0269072 A1 | 12/2005 | Folk et al. |
| 2005/0269104 A1 | 12/2005 | Folk et al. |
| 2005/0269105 A1 | 12/2005 | Pietras |
| 2005/0274508 A1 | 12/2005 | Folk et al. |
| 2006/0037784 A1 | 2/2006 | Walter et al. |
| 2006/0124353 A1 | 6/2006 | Juhasz et al. |
| 2006/0151181 A1 | 7/2006 | Shahin |
| 2006/0180315 A1 | 8/2006 | Shahin et al. |
| 2007/0030167 A1 | 2/2007 | Li et al. |
| 2007/0044973 A1 | 3/2007 | Fraser et al. |
| 2007/0074588 A1 | 4/2007 | Harata et al. |
| 2007/0074874 A1 | 4/2007 | Richardson |
| 2007/0102992 A1 | 5/2007 | Jager |
| 2007/0131416 A1 | 6/2007 | Odell, II et al. |
| 2007/0140801 A1 | 6/2007 | Kuttel et al. |
| 2007/0144730 A1 | 6/2007 | Shahin et al. |
| 2007/0158076 A1 | 7/2007 | Hollingsworth, Jr. et al. |
| 2007/0251699 A1 | 11/2007 | Wells et al. |
| 2007/0251701 A1 | 11/2007 | Jahn et al. |
| 2007/0257811 A1 | 11/2007 | Hall et al. |
| 2008/0059073 A1 | 3/2008 | Giroux et al. |
| 2008/0093127 A1 | 4/2008 | Angman |
| 2008/0099196 A1 | 5/2008 | Latiolais et al. |
| 2008/0125876 A1 | 5/2008 | Boutwell |
| 2008/0202812 A1 | 8/2008 | Childers et al. |
| 2008/0308281 A1 | 12/2008 | Boutwell, Jr. et al. |
| 2009/0151934 A1 | 6/2009 | Heidecke et al. |
| 2009/0159294 A1 | 6/2009 | Abdollahi et al. |
| 2009/0200038 A1 | 8/2009 | Swietlik et al. |
| 2009/0205820 A1 | 8/2009 | Koederitz et al. |
| 2009/0205827 A1 | 8/2009 | Swietlik et al. |
| 2009/0205836 A1 | 8/2009 | Swietlik et al. |
| 2009/0205837 A1 | 8/2009 | Swietlik et al. |
| 2009/0229837 A1 | 9/2009 | Wiens et al. |
| 2009/0266532 A1 | 10/2009 | Revheim et al. |
| 2009/0272537 A1 | 11/2009 | Alikin et al. |
| 2009/0274544 A1 | 11/2009 | Liess |
| 2009/0274545 A1 | 11/2009 | Liess et al. |
| 2009/0316528 A1 | 12/2009 | Ramshaw et al. |
| 2009/0321086 A1 | 12/2009 | Zimmermann |
| 2010/0032162 A1 | 2/2010 | Olstad et al. |
| 2010/0101805 A1 | 4/2010 | Angelle et al. |
| 2010/0200222 A1 | 8/2010 | Robichaux et al. |
| 2010/0206583 A1 | 8/2010 | Swietlik et al. |
| 2010/0206584 A1 | 8/2010 | Clubb et al. |
| 2010/0236777 A1 | 9/2010 | Partouche et al. |
| 2011/0036586 A1 | 2/2011 | Hart et al. |
| 2011/0039086 A1 | 2/2011 | Graham et al. |
| 2011/0088495 A1 | 4/2011 | Buck et al. |
| 2011/0214919 A1 | 9/2011 | McClung, III |
| 2011/0280104 A1 | 11/2011 | McClung, III |
| 2012/0048574 A1 | 3/2012 | Wiens et al. |
| 2012/0152530 A1 | 6/2012 | Wiedecke et al. |
| 2012/0160517 A1 | 6/2012 | Bouligny et al. |
| 2012/0212326 A1 | 8/2012 | Christiansen et al. |
| 2012/0234107 A1 | 9/2012 | Pindiprolu et al. |
| 2012/0298376 A1 | 11/2012 | Twardowski |
| 2013/0055858 A1 | 3/2013 | Richardson |
| 2013/0056977 A1 | 3/2013 | Henderson et al. |
| 2013/0062074 A1 | 3/2013 | Angelle et al. |
| 2013/0075077 A1 | 3/2013 | Henderson et al. |
| 2013/0075106 A1 | 3/2013 | Tran et al. |
| 2013/0105178 A1 | 5/2013 | Pietras |
| 2013/0207382 A1 | 8/2013 | Robichaux |
| 2013/0207388 A1 | 8/2013 | Jansson et al. |
| 2013/0233624 A1 | 9/2013 | In |
| 2013/0269926 A1 | 10/2013 | Liess et al. |
| 2013/0271576 A1 | 10/2013 | Elllis |
| 2013/0275100 A1 | 10/2013 | Ellis et al. |
| 2013/0299247 A1 | 11/2013 | Küttel et al. |
| 2014/0090856 A1 | 4/2014 | Pratt et al. |
| 2014/0116686 A1 | 5/2014 | Odell, II et al. |
| 2014/0131052 A1 | 5/2014 | Richardson |
| 2014/0202767 A1 | 7/2014 | Feasey |
| 2014/0233804 A1 | 8/2014 | Gustavsson et al. |
| 2014/0246839 A1 * | 9/2014 | Hebenstreit ............... B62D 1/20 |
| | | 280/124.125 |
| 2014/0262521 A1 | 9/2014 | Bradley et al. |
| 2014/0305662 A1 | 10/2014 | Giroux et al. |
| 2014/0326468 A1 | 11/2014 | Heidecke et al. |
| 2014/0352944 A1 | 12/2014 | Devarajan et al. |
| 2014/0360780 A1 | 12/2014 | Moss et al. |
| 2015/0014063 A1 | 1/2015 | Simanjuntak et al. |
| 2015/0053424 A1 | 2/2015 | Wiens et al. |
| 2015/0083391 A1 | 3/2015 | Bangert et al. |
| 2015/0107385 A1 | 4/2015 | Mullins et al. |
| 2015/0209946 A1 * | 7/2015 | Scrivens ................ B25B 13/06 |
| | | 29/525.11 |
| 2015/0337648 A1 | 11/2015 | Zippel et al. |

(56) References Cited

U.S. PATENT DOCUMENTS

| | | | |
|---|---|---|---|
| 2016/0024862 | A1 | 1/2016 | Wilson et al. |
| 2016/0138348 | A1 | 5/2016 | Kunec |
| 2016/0145954 | A1 | 5/2016 | Helms et al. |
| 2016/0177639 | A1 | 6/2016 | McIntosh et al. |
| 2016/0215592 | A1 | 7/2016 | Helms et al. |
| 2016/0230481 | A1 | 8/2016 | Misson et al. |
| 2017/0037683 | A1 | 2/2017 | Heidecke et al. |
| 2017/0044854 | A1 | 2/2017 | Hebebrand et al. |
| 2017/0044875 | A1 | 2/2017 | Hebebrand et al. |
| 2017/0051568 | A1 | 2/2017 | Wern et al. |
| 2017/0067303 | A1 | 3/2017 | Thiemann et al. |
| 2017/0067320 | A1 | 3/2017 | Zouhair et al. |
| 2017/0074075 | A1 | 3/2017 | Liess |
| 2017/0211327 | A1 | 7/2017 | Wern et al. |
| 2017/0211343 | A1 | 7/2017 | Thiemann |
| 2017/0284164 | A1 | 10/2017 | Holmes et al. |

FOREIGN PATENT DOCUMENTS

| | | |
|---|---|---|
| AU | 2014215938 A1 | 9/2014 |
| CA | 2 707 050 A1 | 6/2009 |
| CA | 2 841 654 A1 | 8/2015 |
| CA | 2 944 327 A1 | 10/2015 |
| DE | 102007016822 A1 | 10/2008 |
| EP | 0 250 072 A2 | 12/1987 |
| EP | 1 619 349 A2 | 1/2006 |
| EP | 1 772 715 A2 | 4/2007 |
| EP | 1 961 912 A1 | 8/2008 |
| EP | 1 961 913 A1 | 8/2008 |
| EP | 2085566 A2 | 8/2009 |
| EP | 2 322 357 A1 | 5/2011 |
| EP | 3032025 A1 | 6/2016 |
| GB | 1487948 A | 10/1977 |
| GB | 2 077 812 A | 12/1981 |
| GB | 2 180 027 A | 3/1987 |
| GB | 2 228 025 A | 8/1990 |
| GB | 2 314 391 A | 12/1997 |
| WO | 2004/079153 A2 | 9/2004 |
| WO | 2004/101417 A2 | 11/2004 |
| WO | 2007/001887 A2 | 1/2007 |
| WO | 2007/070805 A2 | 6/2007 |
| WO | 2007127737 A2 | 11/2007 |
| WO | 2008005767 A1 | 1/2008 |
| WO | 2009/076648 A2 | 6/2009 |
| WO | 2012100019 A1 | 7/2012 |
| WO | 2012/115717 A2 | 8/2012 |
| WO | 2014056092 A1 | 4/2014 |
| WO | 2015/000023 A1 | 1/2015 |
| WO | 2015/119509 A1 | 8/2015 |
| WO | 2015/127433 A1 | 8/2015 |
| WO | 2015176121 A1 | 11/2015 |
| WO | 2016197255 A1 | 12/2016 |
| WO | 2017/044384 A1 | 3/2017 |

OTHER PUBLICATIONS

Streicher Load/Torque Cell Systems; date unknown; 1 page.
3PS, Inc.; Enhanced Torque and Tension Sub with Integrated Turns; date unknown; 2 total pages.
Lefevre, et al.; Drilling Technology; Deeper, more deviated wells push development of smart drill stem rotary shouldered connections; dated 2008; 2 total pages.
PCT Invitaiton to Pay Additional Fees for International Application No. PCT/US2008/086699; dated Sep. 9, 2009; 7 total pages.
PCT Notification of Transmittal of the International Search Report and the Written Opinion of the International Searching Authority for International Application No. PCT/US2008/086699; dated Sep. 11, 2009; 19 total pages.
National Oilwell Varco; Rotary Shoulder Handbook; dated 2010; 116 total pages.
Weatherford; TorkSub™ Stand-Alone Torque Measuring System; dated 2011-2014; 4 total pages.
Australian Examination Report for Application No. 2008334992; dated Apr. 5, 2011; 2 total pages.
European Search Report for Application No. 08 860 261.0-2315; dated Apr. 12, 2011; 4 total pages.
Eaton; Spool Valve Hydraulic Motors; dated Sep. 2011; 16 total pages.
European Extended Search Report for Application No. 12153779.9-2315; dated Apr. 5, 2012; 4 total pages.
Australian Examination Report for Application No. 2012201644; dated May 15, 2013; 3 total pages.
Warrior; 250E Electric Top Drive (250-TON); 250H Hydraulic Top Drive (250-TON); dated Apr. 2014; 4 total pages.
Hydraulic Pumps & Motors; Fundamentals of Hydraulic Motors; dated Jun. 26, 2014; 6 total pages.
Warrior; Move Pipe Better; 500E Electric Top Drive (500 ton-1000 hp); dated May 2015; 4 total pages.
Canadian Office Action for Application No. 2,837,581; dated Aug. 24, 2015; 3 total pages.
European Extended Search Report for Application No. 15166062.8-1610; dated Nov. 23, 2015; 6 total pages.
Australian Examination Report for Application No. 2014215938; dated Feb. 4, 2016; 3 total pages.
Rexroth; Bosch Group; Motors and Gearboxes; Asynchronous high-speed motors 1 MB for high speeds; dated Apr. 13, 2016; 6 total pages.
Canadian Office Action for Application No. 2,837,581; dated Apr. 25, 2016; 3 total pages.
PCT Notification of Transmittal of the International Search Report and the Written Opinion of the International Searching Authority for International Application No. PCT/US2015/061960; dated Jul. 25, 2016; 16 total pages.
PCT Notification of Transmittal of the International Search Report and the Written Opinion of the International Searching Authority for International Application No. PCT/US2016/049462; dated Nov. 22, 2016; 14 total pages.
PCT Notification of Transmittal of the International Search Report and the Written Opinion of the International Searching Authority for International Application No. PCT/US2016/050542; dated Nov. 25, 2016; 13 total pages.
PCT Notification of Transmittal of the International Search Report and the Written Opinion of the International Searching Authority for International Application No. PCT/US2016/046458; dated Dec. 14, 2016; 16 total pages.
PCT Notification of Transmittal of the International Search Report and the Written Opinion of the International Searching Authority for International Application No. PCT/US2016/047813; dated Jan. 12, 2017; 15 total pages.
PCT Notification of Transmittal of the International Search Report and the Written Opinion of the International Searching Authority for International Application No. PCT/US2016/050139; dated Feb. 20, 2017; 20 total pages.
PCT Notification of Transmittal of the International Search Report and the Written Opinion of the International Searching Authority for International Application No. PCT/US2017/014646; dated Apr. 4, 2017; 14 total pages.
PCT Notification of Transmittal of the International Search Report and the Written Opinion of the International Searching Authority for International Application No. PCT/US2017/014224; dated Jun. 8, 2017; 15 total pages.
European Extended Search Report for Application No. 17152458.0-1609; dated Jun. 8, 2017; 7 total pages.
Australian Examination Report for Application No. 2017200371; dated Sep. 19, 2017; 5 total pages.
European Extended Search Report for Application No. 17195552.9-1614; dated Dec. 4, 2017; 6 total pages.
Australian Examination Report for Application No. 2017200371; dated Feb. 8, 2018; 6 total pages.
Canadian Office Action for Application No. 2,955,754; dated Mar. 28, 2018; 3 total pages.
Australian Examination Report for Application No. 2017200371; dated May 2, 2018; 4 total pages.
Canadian Office Action for Application No. 2,974,298; dated May 16, 2018; 3 total pages.

(56) References Cited

OTHER PUBLICATIONS

European Patent Office; Extended European Search Report for Application No. 18157915.2; dated Jun. 6, 2018; 8 total pages.
Canadian Office Action in related application CA 2,955,754 dated Jul. 17, 2018.
EPO Extended European Search Report dated Jul. 19, 2018, for European Application No. 18159595.0.
EPO Extended European Search Report dated Jul. 17, 2018, for European Application No. 181580507.
Cookson, Colter, "Inventions Speed Drilling, Cut Costs," The American Oil & Gas Reporter, Sep. 2015, 2 pages.
Ennaifer, Amine et al., "Step Change in Well Testing Operations," Oilfield Review, Autumn 2014: 26, No. 3, pp. 32-41.
Balltec Lifting Solutions, LiftLOK™ Brochure, "Highest integrity lifting tools for the harshest environments," 2 pages.
Balltec Lifting Solutions, CoilLOK™ Brochure, "Highest integrity hand-held coiled tubing handling tools," 2 pages.
Peters; Tool Coupler for Use With a Top Drive; U.S. Appl. No. 15/656,508, filed Jul. 21, 2017. (Application not attached to IDS.).
Fuehring et al.; Tool Coupler With Rotating Coupling Method for Top Drive; U.S. Appl. No. 15/445,758, filed Feb. 28, 2017. (Application not attached to IDS.).
Bell; Interchangeable Swivel Combined Multicoupler; U.S. Appl. No. 15/607,159, filed May 26, 2017 (Application not attached to IDS.).
Amezaga; Dual Torque Transfer for Top Drive System; U.S. Appl. No. 15/447,881, filed Mar. 2, 2017. (Application not attached to IDS.).
Zouhair; Coupler With Threaded Connection for Pipe Handler; U.S. Appl. No. 15/444,016, filed Feb. 27, 2017. (Application not attached to IDS.).
Liess; Downhole Tool Coupling System; U.S. Appl. No. 15/670,897, filed Aug. 7, 2017. (Application not attached to IDS.).
Muller et al; Combined Multi-Coupler With Rotating Locking Method for Top Drive; U.S. Appl. No. 15/721,216, filed Sep. 29, 2017. (Application not attached to IDS.).
Amezaga et al; Tool Coupler With Threaded Connection for Top Drive; U.S. Appl. No. 15/457,572, filed Mar. 13, 2017. (Application not attached to IDS.).
Wiens; Combined Multi-Coupler With Locking Clamp Connection for Top Drive; U.S. Appl. No. 15/627,428, filed Jun. 19, 2017. (Application not attached to IDS.).
Henke et al.; Tool Coupler With Sliding Coupling Members for Top Drive; U.S. Appl. No. 15/448,297, filed Mar. 2, 2017. (Application not attached to IDS.).
Schoknecht et al.; Combined Multi-Coupler With Rotating Fixations for Top Drive; U.S. Appl. No. 15/447,926, filed Mar. 2, 2017. (Application not attached to IDS.).
Metzlaff et al.; Combined Multi-Coupler for Top Drive; U.S. Appl. No. 15/627,237, filed Jun. 19, 2017. (Application not attached to IDS.).
Liess; Combined Multi-Coupler for Top Drive; U.S. Appl. No. 15/656,914, filed Jul. 21, 2017. (Application not attached to IDS.).
Liess et al.; Combined Multi-Coupler; U.S. Appl. No. 15/656,684, filed Jul. 21, 2017. (Application not attached to IDS).
Amezaga et al.; Tool Coupler With Data and Signal Transfer Methods for Top Drive; U.S. Appl. No. 15/730,305, filed Oct. 11, 2017. (Application not attached to IDS).
Liess; Tool Coupler With Threaded Connection for Top Drive; U.S. Appl. No. 15/806,560, filed Nov. 8, 2017. (Application not attached to IDS).
EPO Partial European Search Report dated Jul. 31, 2018, for European Application No. 18159597.6.
European Patent Office; Extended Search Report for Application No. 18160808.4; dated Sep. 20, 2018; 8 total pages.
EPO Partial European Search Report dated Oct. 4, 2018, for European Patent Application No. 18159598.4.
EPO Extended European Search Report dated Oct. 5, 2018, for European Patent Application No. 18173275.1.
EPO Extended European Search Report dated Nov. 6, 2018, for European Application No. 18159597.6.
International Search Report and Written Opinion in PCT/US2018/042812 dated Oct. 17, 2018.
Extended Search Report in application EP18177312.8 dated Nov. 6, 2018.

\* cited by examiner

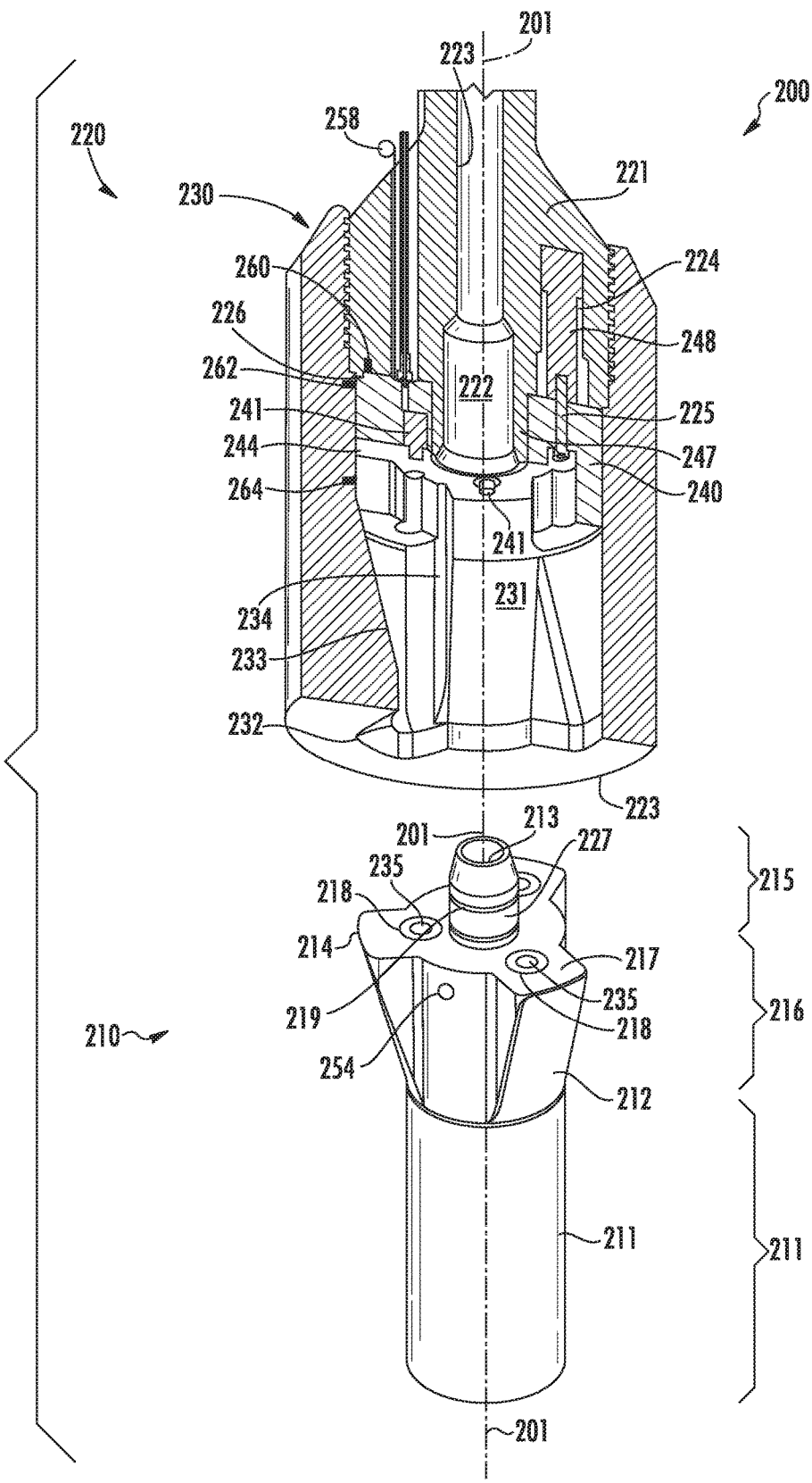

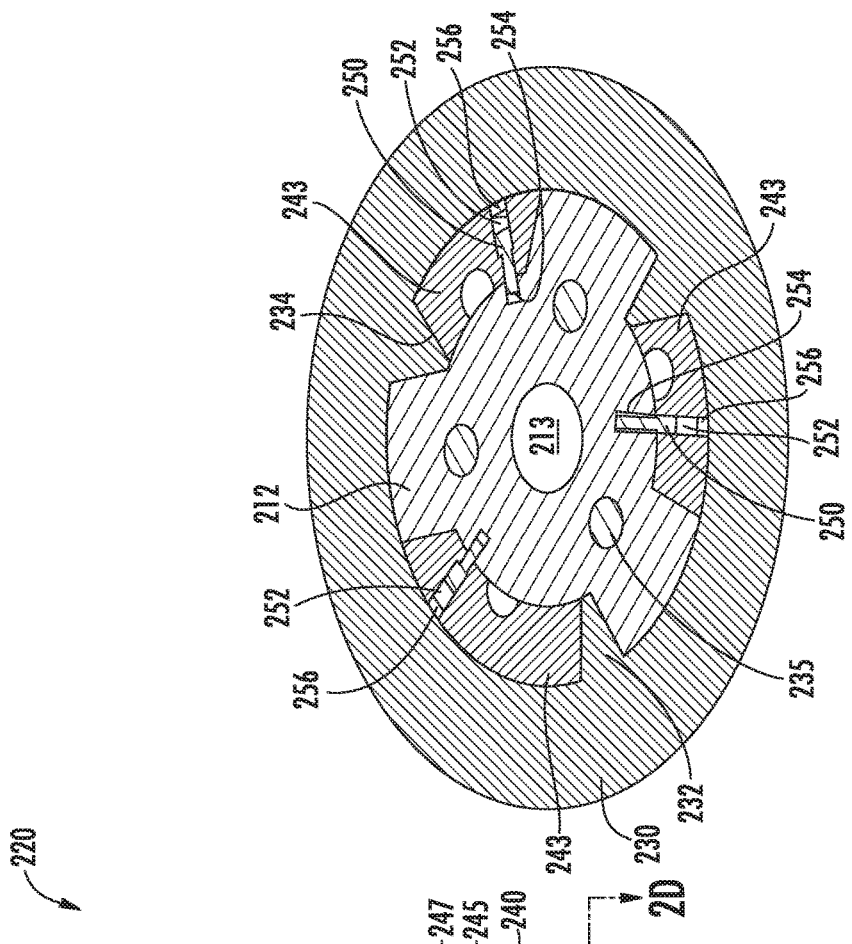
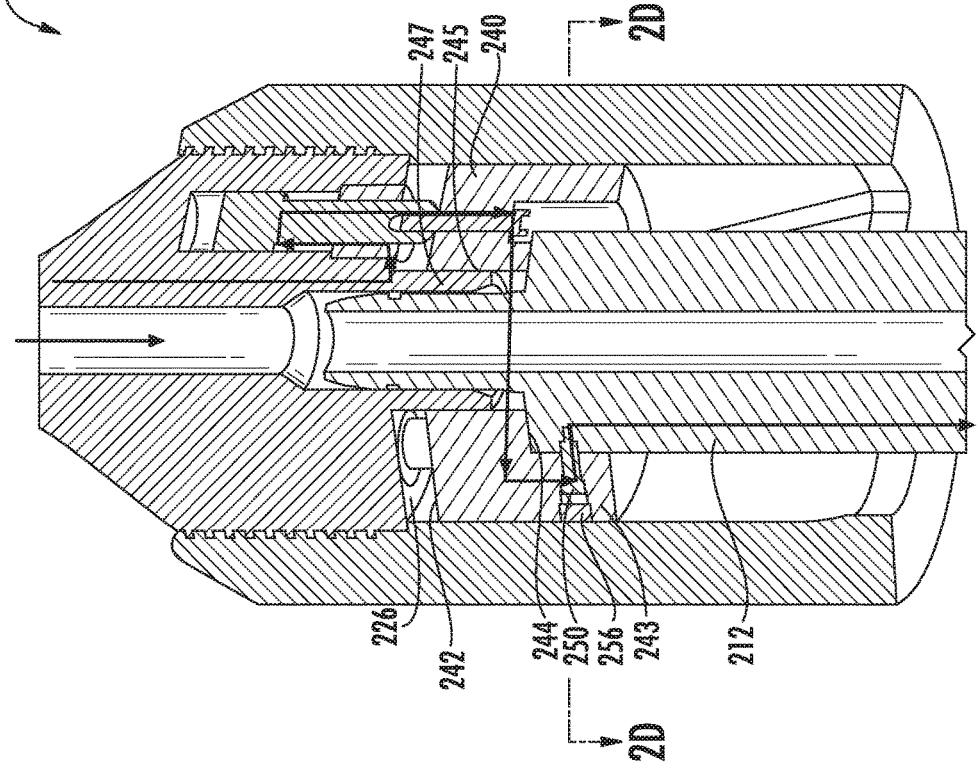

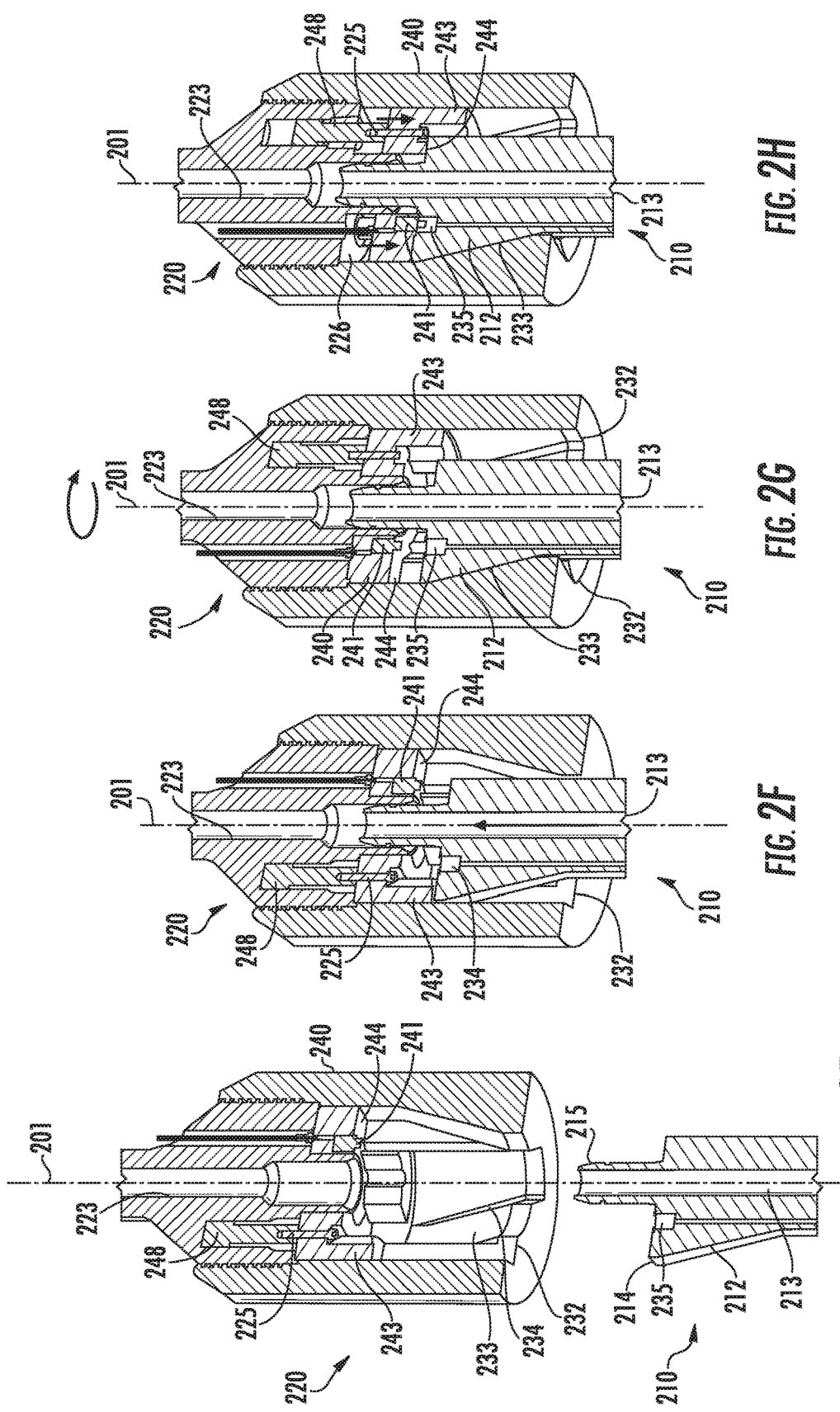

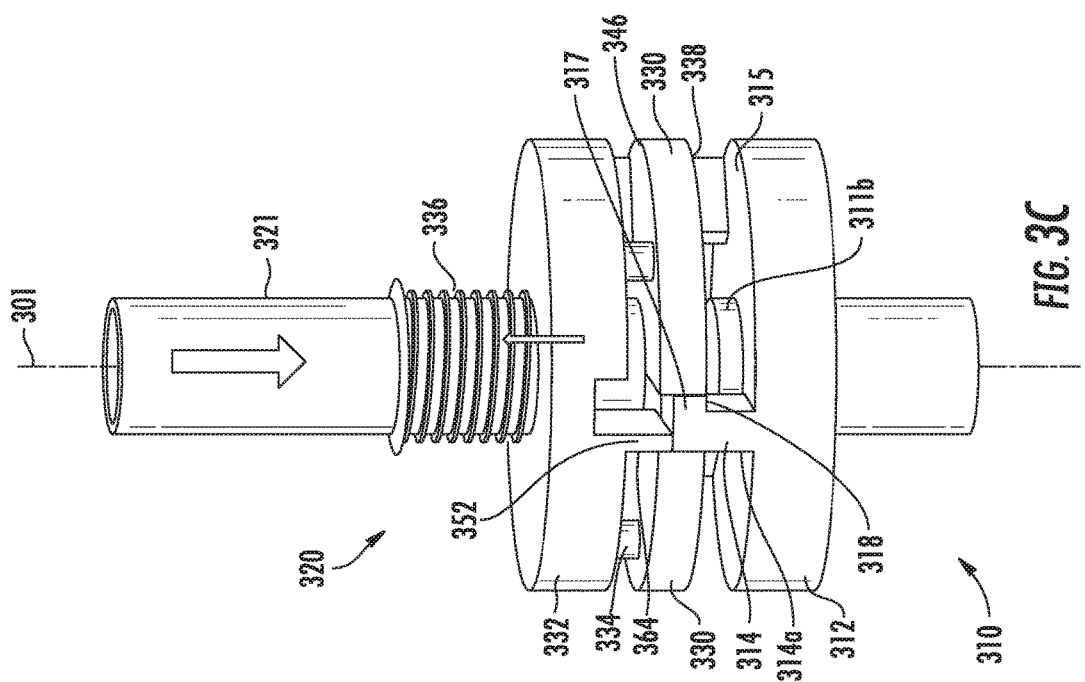
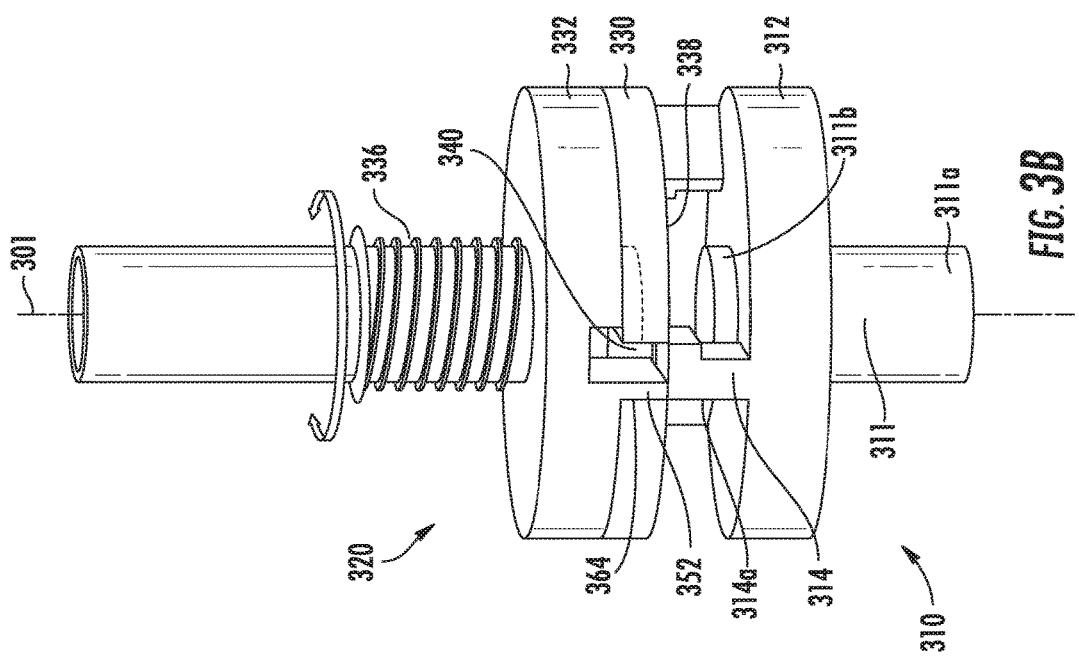

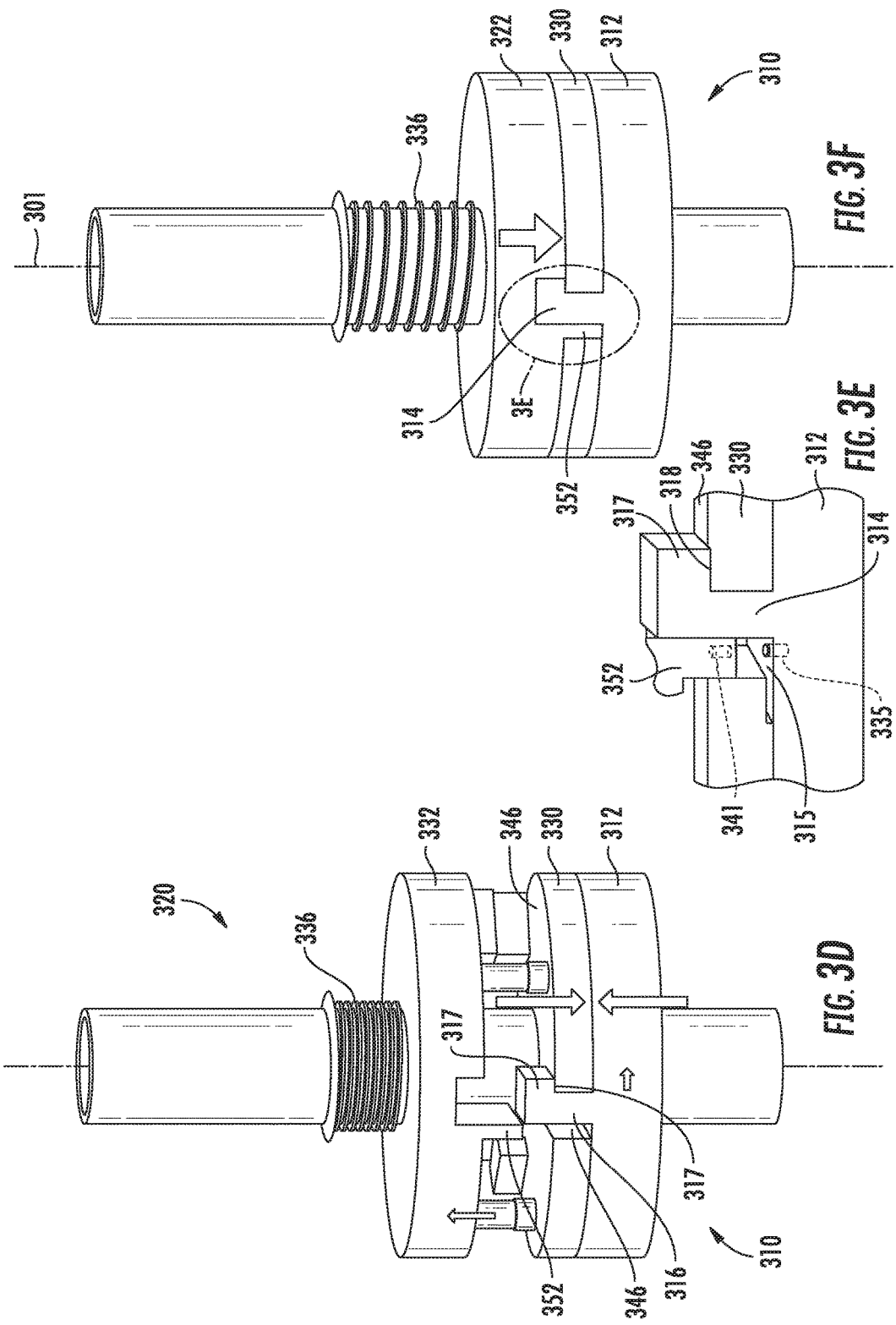

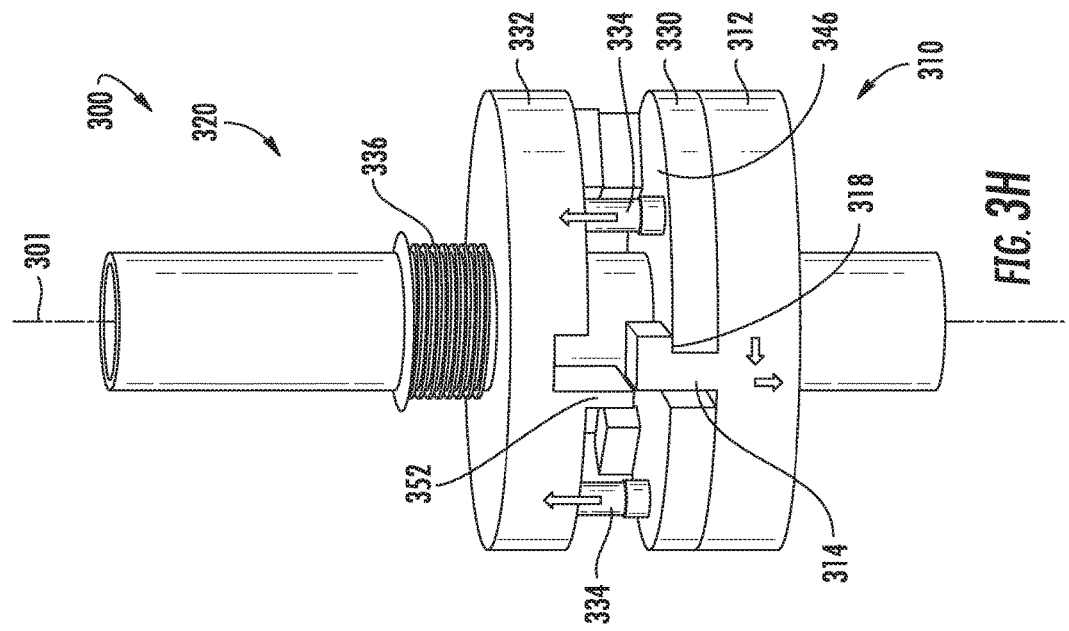
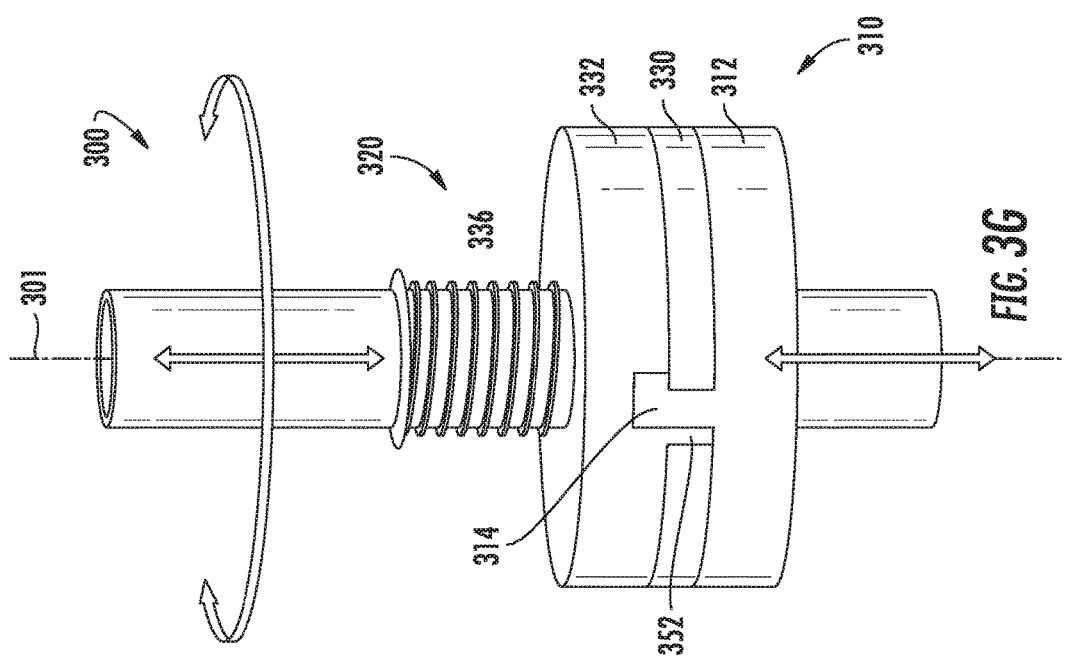

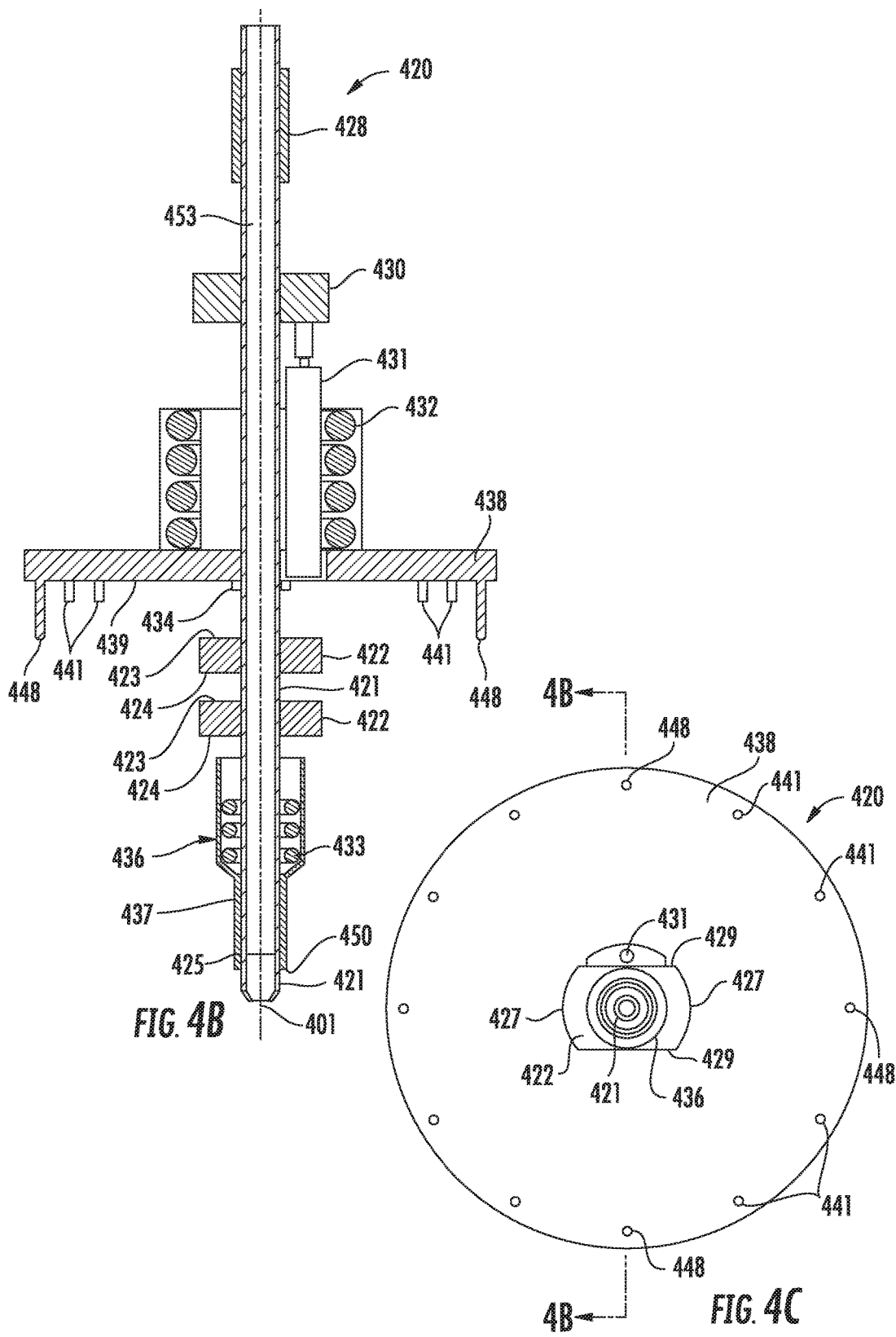

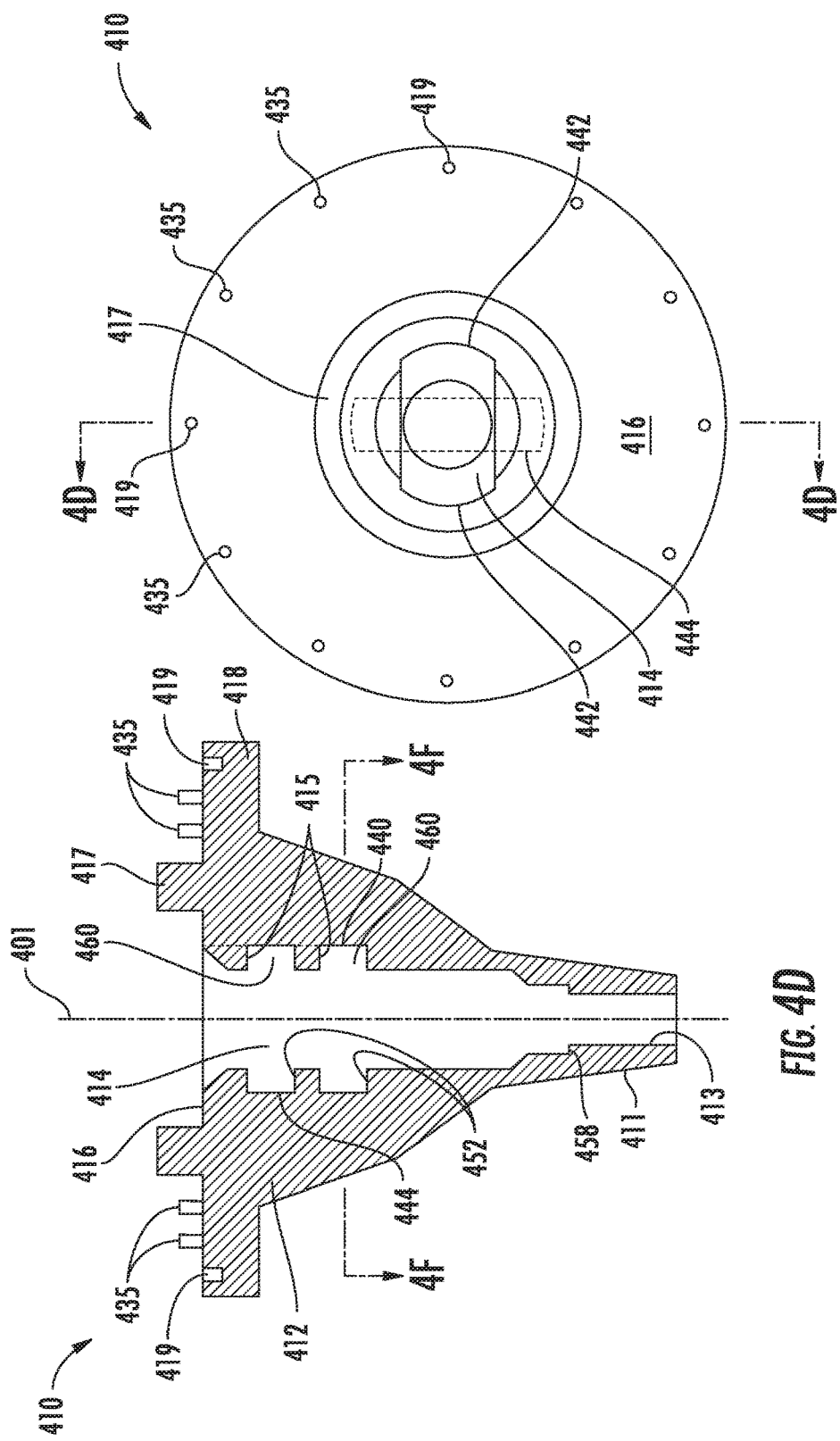

COMBINED MULTI-COUPLER

BACKGROUND

Field of the Disclosure

The present disclosure generally relates to a combined multi-coupler for coupling a top drive to one or more tools.

Description of the Related Art

A wellbore is formed to access hydrocarbon-bearing formations (e.g., crude oil and/or natural gas) or for geothermal power generation by the use of drilling. Drilling is accomplished by utilizing a drill bit that is mounted on the end of a drill string. To drill within the wellbore to a predetermined depth, the drill string is often rotated by a top drive on a drilling rig. After drilling to a predetermined depth, the drill string and drill bit are removed and a string of casing is lowered into the wellbore. An annulus is thus formed between the casing string and the wellbore. The casing string is hung from the wellhead. A cementing operation is then conducted in order to fill the annulus with cement. The casing string is cemented into the wellbore by circulating cement into the annulus defined between the outer wall of the casing and the borehole. The combination of cement and casing strengthens the wellbore and facilitates the isolation of certain areas of the formation behind the casing for the production of hydrocarbons.

During a drilling and well construction operation, various tools are used which have to be attached to the top drive. The process of changing tools is very time consuming and dangerous requiring personnel to work at heights.

Therefore, safer, faster, more reliable, and more efficient connections that are capable of conveying load, data, signals, power and/or bi-directional torque between the tool string and the top drive are needed.

SUMMARY

The present disclosure generally relate to a combined multi-coupler for connecting a top drive to one or more tools.

One embodiment of the present disclosure provides a combined multi-coupler for a top drive. The combined multi-coupler includes a housing having a connection recess, wherein the connection recess has a bayonet profile, and one or more tapered load shoulders are formed in the connection recess, a locking plate movably disposed in the housing; and one or more couplers disposed in the locking plate.

Another embodiment of the present disclosure provides a combined multi-coupler. The combined multi-coupler includes a stem for connecting to the top drive, a first coupling plate fixed attached to the stem, wherein the first coupling plate has one or more notches formed therethrough, a securing plate movable relative to the first coupling plate, wherein the securing plate has one or more securing keys aligned with the one or more notches in the first coupling plate, and each securing key is movable between a locked position in the corresponding notch and an unlocked position out of the corresponding notch.

Another embodiment the present disclosure provides a combined multi-coupler for a top drive. The combined-multi-coupler includes a stem for connecting to the top drive, one or more lugs fixedly attached to the stem, a coupling plate movably attached to the stem, and one or more couplers disposed on the coupling plate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2A is a schematic perspective view a combined multi-coupler according to one embodiment of the present disclosure in a disconnection position.

FIG. 2C is a schematic sectional side view of the combined multi-coupler of FIG. 2A in the connected position.

FIG. 2D is a schematic sectional bottom view of the combined multi-coupler of FIG. 2A in the connected position.

FIGS. 2E-2H schematically illustrate a connecting sequence of the combined multi-coupler of FIG. 2A.

FIGS. 3B-3G schematically illustrate a connecting sequence of the combined multi-coupler of FIG. 3A.

FIG. 3F is a schematic perspective view of the combined multi-coupler of FIG. 3A in a connected position.

FIG. 3H schematically illustrates a disconnect sequence of the combined multi-coupler of FIG. 3A.

FIG. 4B is a schematic sectional side view of a drive stem in the combined multi-coupler of FIG. 4A.

FIG. 4C is a schematic bottom view of the drive stem of FIG. 4B.

FIG. 4D is a schematic sectional side view of a tool dock in the combined multi-coupler of FIG. 4A.

FIG. 4E is a schematic top view of the tool dock of FIG. 4D.

FIGS. 4G-4K schematically illustrate a connecting sequence of the combined multi-coupler of FIG. 4A.

Figure 1:
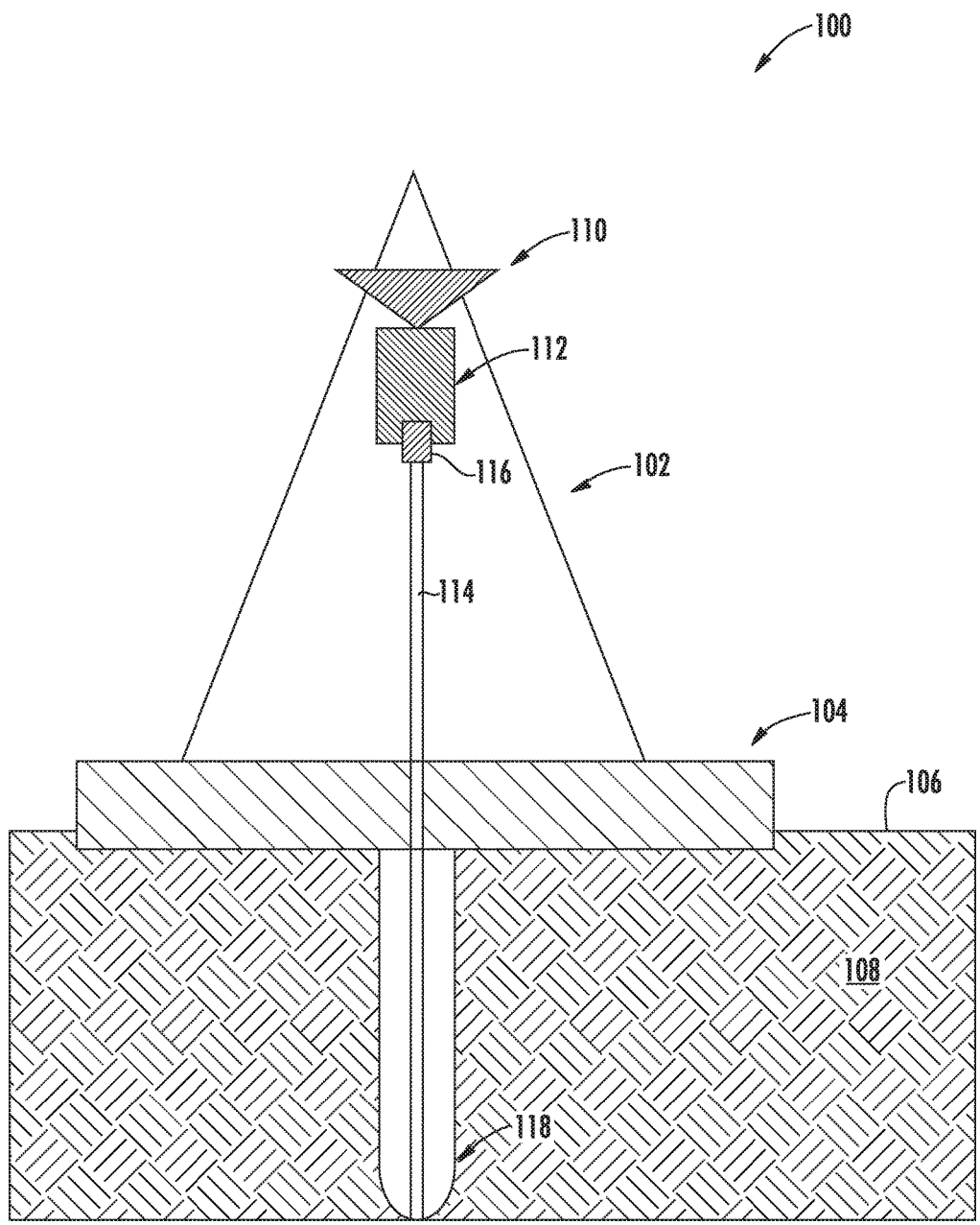
FIG. 1 schematically illustrates a drilling system according to embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The present disclosure provides apparatus and methods for making a connection between a top drive and a tool. The connection may provide mechanical, electrical, optical, hydraulic, and/or pneumatic connections between the top drive and the tool. For example, the connection may transfer torsional and axial loads between the top drive and the tool. The connection may also convey data, signals, optical, pneumatic, hydraulic, and/or electric communications.

It should be understood that "below", "above", "vertically", "up", "down", and similar terms as used herein refer to the general orientation of the top drive 112 as illustrated in FIG. 1. In some instances, the orientation may vary somewhat, in response to various operational conditions. In any instance wherein the central axis of the top drive system is not aligned precisely with the direction of gravitational force, "below", "above", "vertically", "up", "down", and similar terms should be understood to be along the central axis of the top drive system.

FIG. 1 schematically illustrates a drilling system 100 according to embodiments of the present disclosure. The drilling system 100 may include a drilling rig derrick 102 disposed on a rig floor 104. The rig floor 104 may be disposed at a ground surface 106 above a subsurface formation 108 as shown in FIG. 1. Alternatively, the drilling system 100 may also be an offshore drilling unit, having a platform or subsea wellhead in place of or in addition to the rig floor 104. The drilling rig derrick 102 may support a hoist 110, thereby supporting a top drive 112. In some embodiments, the hoist 110 may be connected to the top drive 112 by threaded couplings. The top drive 112 may be connected to a tool string 114 to operate in a wellbore 118 formed through the subsurface formation 108.

A combined multi-coupler 116 according to embodiments of the present disclosure may be used to connect the top drive 112 and the tool string 114. The combined multi-coupler 116 may transfer axial load so that the top drive 112 supports the axial load of tool string 114. The combined multi-coupler 116 may also transfer torsional loads so that the top drive 112 may provide torque to the tool string 114, for example to operate a drilling bit near the bottom of the wellbore 118. The combined multi-coupler 116 may also provide communication of power and/or signals between the top drive 112 and the tool string 114. For example, pneumatic, hydraulic, electrical, optical, or other power and/or signals may be communicated between the top drive 112 and the tool string 114 through the combined multi-coupler 116.

Combined Multi-Coupler with Tapered Load Shoulders

FIG. 2A is a schematic perspective view a combined multi-coupler 200 according to one embodiment of the present disclosure. The combined multi-coupler 200 may be used to connect and disconnect a top drive and a tool. The combined multi-coupler 200 may be used in place of the combined multi-coupler 116 of FIG. 1.

Figure 2B:
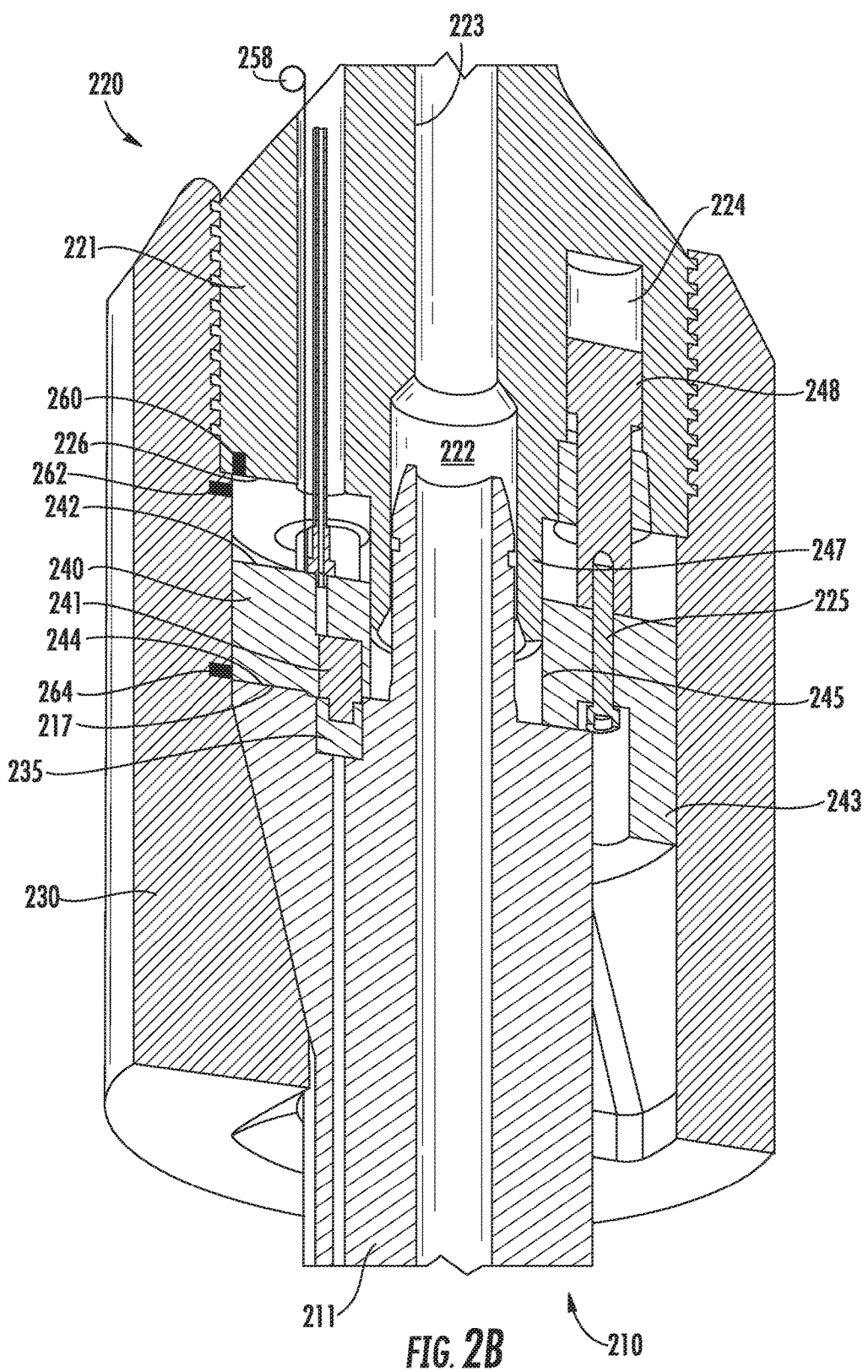
FIG. 2B is a schematic sectional side view of the combined multi-coupler of FIG. 2A in a connected position.

FIG. 2A schematically illustrates the combined multi-coupler 200 in a disconnected positon. FIG. 2B is a schematic sectional side view of the combined multi-coupler 200 in a connected position. The combined multi-coupler 200 may include a drive stem 220 and a tool dock 210. The drive stem 220 may be coupled to a top drive. The tool dock 210 may be connected to a tool or a tool string. The drive stem 220 and the tool dock 210 may be quickly connected and disconnected. When connected, the combined multi-coupler 200 provide a torque transfer mechanism and/or a connection of couples to transfer pressured fluid, data, or another other types of signals between the tool dock 210 and the drive stem 220.

The tool dock 210 may include a torque shaft portion 211, a load shoulder portion 216, and an end portion 215. A central bore 213 may extend through the tool dock 210 along a longitudinal central axis 201. The torque shaft portion 211 may be configured to connect with a tool or a tool string. The load shoulder portion 216 may have one or more tapered load shoulders 212. Each load shoulder 212 tapers from the end portion 215 towards the torque shaft portion 211. The one or more load shoulders 212 form a bayonet profile 214 at a top surface 217 of the load shoulder portion 216. In the embodiment of FIG. 2A, three load shoulders 212 are formed at substantially equal intervals. Alternatively, other numbers of load shoulders 212 may be used. Alternatively, the load shoulders 212 may be formed at substantially unequal intervals to insure that the tool dock 210 and the drive stem 220 can be connected at a predetermined orientation. The end portion 215 extends from the top surface 217 with a reduced outer diameter. In one embodiment, the end portion 215 may include a gland 219 configured to receive a sealing element 227.

In one embodiment, one or more cavities 218 may be formed at the top surface 217. A coupler 235 may be disposed in the cavity 218. The coupler 235 may be a coupler for transferring hydraulic, pneumatic, electrical, or optical couplings, providing fluid, electrical, optical, signal, data, and/or power communication, or other types of communication. In one embodiment, the coupler 235 may be a female coupler. In one embodiment, the coupler 235 may be adjustable axially along the central axis 201 to provide tolerances to connection and wear. For example, the couplers 235 may be moveable axially within the cavities 218. In one embodiment, the coupler 235 is also movable along radial directions within the corresponding cavity 218 to provide a tolerance to axial displacement between the tool dock 210 and the drive stem 220 and/or clearance between the tool dock 210 and the drive stem 220.

The drive stem 220 may include a stem 221 and a housing 230 joined together. The stem 221 and the housing 230 may be joined together by a threaded connection, or other suitable connection means. Alternatively, the drive stem 220 may be a unitary body. The stem 221 may include a central bore 223. A connection recess 222 may form at a lower end of the central bore 223 to make a fluid connection with the end portion 215 of the tool dock 210.

The stem 221 may include a central tubing 247 extending from a lower surface 226 and form a shoulder to receive a guided locking plate 240 and to form an end stop for the tool dock 210. The guided locking plate 240 may be movably disposed in the housing 230. In one embodiment, the guided locking plate 240 may be moved by one or more actuated pins 225. The stem 221 may include one or more recesses 224 formed from the lower surface 226. An actuator 248 may be disposed in each recess 224. Each actuator 248 may be coupled to a corresponding pin 225 to move the guided locking plate 240. The actuator 248 may pull and push the pin 225 to move the guided locking plate 240 up and down in the housing 230. In one embodiment, the actuator 248 may be hydraulic cylinders. Alternatively, the actuator 248 may be any other form for displacement motors.

The housing 230 may include a cavity 231 for receiving the tool dock 210. The cavity 231 may have a bayonet profile 232 matching the bayonet profile 214 of the tool dock 210. The housing 230 may also include tapered load shoulders 233 matching the load shoulders 212 of the tool dock 210. In one embodiment, the housing 230 may include one or more stopping face 234.

The guided locking plate 240 may by a substantially ring shaped plate having a central bore 245 surrounding the central tubing 247. A notch (not shown) may be formed on an outer diameter of the guided locking plate 240. The notch matches the profile of the stopping face 234 therefore preventing relative rotation between the guided locking plate 240 and the housing 230. The guided locking plate 240 includes a lower surface 244 and an upper surface 242. One or more locking blocks 243 may extend over the lower surface 244. The one or more locking blocks 243 may be formed near the outer diameter of the guided locking plate 240. In one embodiment, the locking blocks 243 may have a profile similar to the stopping face 234. During operation, the locking blocks 243 are inserted between the load shoulder 212 of the tool dock 210 so that the lower surface 244 is pressed against the top surface 217 of the tool dock 210 to preload the connection between the drive stem 220 and the tool dock 210, therefore, preventing rattling during operation. The locking mechanism also maintains the connection between the drive stem 220 and the tool dock 210. When in position, the locking blocks 243 prevent the drive stem 220 from rotating relative to the tool dock 210. The pins 225 raise or lower the guided locking plate 240.

In one embodiment, one or more couplers 241 may be disposed in the guided locking plate 240. The one or more couplers 241 may be male couplers protruding from the lower surface 244. The couplers 241 may be arranged to match couplers 235 in the tool dock 210. Each coupler 241 may be configured to transfer hydraulic, pneumatic, electrical, or optical couplings, providing fluid, electrical, optical, signal, data, and/or power communication, or other types of communication.

In one embodiment, the couplers 241 may be movable axially, along the direction of the central axis 201, to provide tolerances for connection with the couplers 235 and/or wears on the load shoulders 212 and 233. For example, when the load shoulders 212 and 233 become worn, the guided locking plate 240 may be programed to stop at a different position, such as a lower position, to accommodate the worn load shoulders 212 and 233 and maintain the connection between the load shoulders 212 and 233 and the connection between the couplers 235 and 241. In one embodiment, the couplers 235 and/or the couplers 241 may be moved axially and radially to provide tolerance and/or clearance for axial alignment and axial connection between the tool dock 210 and the drive stem 220.

In one embodiment, the combined multi-coupler 200 may also include a compensation mechanism. FIG. 2C is another schematic sectional side view of the combined multi-coupler 200 the connected position showing the compensation mechanism. FIG. 2D is a schematic sectional bottom view of the combined multi-coupler 200. As shown in FIG. 2C, the combined multi-coupler 200 may include one or more locking elements 250 configured to selectively secure the tool dock 210 to the guided locking plate 240. The guided locking plate 240 may include one or more cavities 252 formed therein to receive the one or more locking elements 250. In one embodiment, the one or more cavities 252 may be formed in the locking blocks 243. One or more recesses 254 may be formed in the tool dock 210 for receiving the one or more locking elements 250 when the combined multi-coupler 200 is in the connected position.

The locking element 250 may be a bolt, a latch, or other suitable devices to allow the guided locking plate 240 to move axially along the central axis 201 with the tool dock 210.

In one embodiment, an actuator 248 may be coupled to each locking element 250 to move the locking element 250 between a locked position and an unlock position. In the locked position, the locking element 250 protrudes from the cavity 252 and inserts into the recess 254 locking the tool dock 210 to the guided locking plate 240, as shown in FIGS. 2C-2D. In the unlock position, the locking element 250 retracts back into the cavity 252 releasing the tool dock 210 from the guided locking plate 240. The actuator 248 may be a hydraulic cylinders or any other form of displacement motors.

FIGS. 2E-2H schematically illustrate a connecting sequence of the combined multi-coupler 200. In FIG. 2E, the tool dock 210 is positioned below the drive stem 220 to align along the same central axis 201. The tool dock 210 and the drive stem 220 may be rotated about the central axis 201 to align the bayonet profile 214 on the tool dock 210 with the bayonet profile 232 on the drive stem 220. In the drive stem 220, the guided locking plate 240 is moved up so that the locking blocks 243 are cleared from the tapered load shoulders 233.

In FIG. 2F, the drive stem 220 and the tool dock 210 may be moved relative to each other along the central axis 201 so that the tool dock 210 is inserted into the drive stem 220. The tool dock 210 may be moved up into the drive stem 220. Alternatively, the drive stem 220 may be moved down towards the tool dock 210. The locking blocks 243 may serve as an end point of inserting the tool dock 210 into the drive stem 220. For example, the tool dock 210 and the drive stem 220 may be moved to each other until the tool dock 210 reaches a bottom surface of the locking blocks 243. At this position, the end portion 215 of the tool dock 210 is inserted into the connection recess 222 in the drive stem 220 forming a sealed connection between the central bore 223 in the drive stem 220 and the central bore 213 in the tool dock 210.

In FIG. 2G, the tool dock 210 and the drive stem 220 may be rotated relative to each other about the central axis 201 to engage the load shoulders 212 of the tool dock 210 with the tapered load shoulders 233 of the drive stem 220. In one embodiment, the relative rotation may be performed by rotating the drive stem 220, for example, using the top drive. Alternatively, the relative rotation may be performed by rotating the tool dock 210. The stopping face 234 may serve as the end point of the relative rotation. For example, the relative rotation may be stopped when the load shoulders 212 come to in contact with the stopping face 234. At this position, the load shoulders 212 and the load shoulders 233 are engaged with each other to transfer axial loads between the tool dock 210 and the drive stem 220.

At the position of FIG. 2G, the couplers 241 in the drive stem 220 are also aligned with corresponding couplers 235 in the drive stem 220. The load shoulders 212 in the tool dock 210 also clear off the bayonet profile 232 in the drive stem 220 to allow the guided locking plate 240 to move down.

In FIG. 2H, the guided locking plate 240 is moved down so that the locking blocks 243 fit in the bayonet profile 232 between the load shoulders 212 preventing the tool dock 210 from rotating relative to the drive stem 220, thus, enabling torque load transfer between the tool dock 210 and the drive stem 220. The guided locking plate 240 may be moved down by the actuator 248. The downward movement of the guided locking plate 240 may stop when the lower surface 244 of the guided locking plate 240 encounters the top surface 217 of the tool dock 210. Positioning the lower surface 244 against the tool dock 210 also creates an axial preload between the tool dock 210 and the drive stem 220 to allow operation, such as drilling, without clattering inside the connection.

At the position of FIG. 2H, the couplers 241 and 235 are engaged with each other forming connections therebetween. The connections between each pair of the couplers 241 and 235 may be used to transfer hydraulic, pneumatic, electrical, or optical couplings, providing fluid, electrical, optical, signal, data, and/or power communication.

In the position shown in FIG. 2H, the tool dock 210 and the drive stem 220 are connected and ready for operation. The connection between the tool dock 210 and the drive stem 220 transfers axial loads through engagement between the load shoulders 212 and 233, torque transfer through the engagement between the sides of the load shoulders 212 with the stopping faces 234 and the locking blocks 243, and hydraulic, pneumatic, electrical, optical, or other types of communication through connections between the couplers 235 and 241.

In one embodiment, the locking element 250 may be selectively activated to allow axial compensation between the tool dock 210 and the drive stem 220, for example during making or breaking tubular connections in the workstring attached to the tool dock 210.

To activate axial compensation, the locking element 250 may be moved from a retracted position to connect with the tool dock 210 as shown in FIG. 2C. The locking element 250 may be moved by the actuator 256. After the locking element 250 is connected to the tool dock 210, the actuators 248 may lift the guided locking plate 240 with the tool dock 210 to provide a compensation force. In one embodiment, the compensation force may be the weight of triple tubulars during making up. The compensation force may be adjusted. For example, when the actuators 248 are hydraulic cylinders, the compensation force may be adjusted by adjusting the pressure at the rod side of the hydraulic cylinders.

In one embodiment, sensors may be used to provide end stops and/or a feedback of the compensation stroke. For example, proximity sensors 260, 262, 264 may be used at suitable locations, such as at an upper position and a lower position of the guided locking plate 240, to provide end stops for the compensation stroke. A length transducer 258 maybe positioned at a suitable position, such as through an internal opening for connections to the couplers 241, to provide a feedback of the compensation stroke.

Even though in the embodiment of FIGS. 2A-2H, the drive stem 220 is coupled to a top drive while the tool dock 210 is coupled to a tool, the drive stem 220 and the tool dock 210 may switch positions such that the tool dock 210 is coupled to the top drive and the drive stem 220 is coupled to a tool.

Combined Multi-Coupler with Interlocking Structure

Figure 3A:
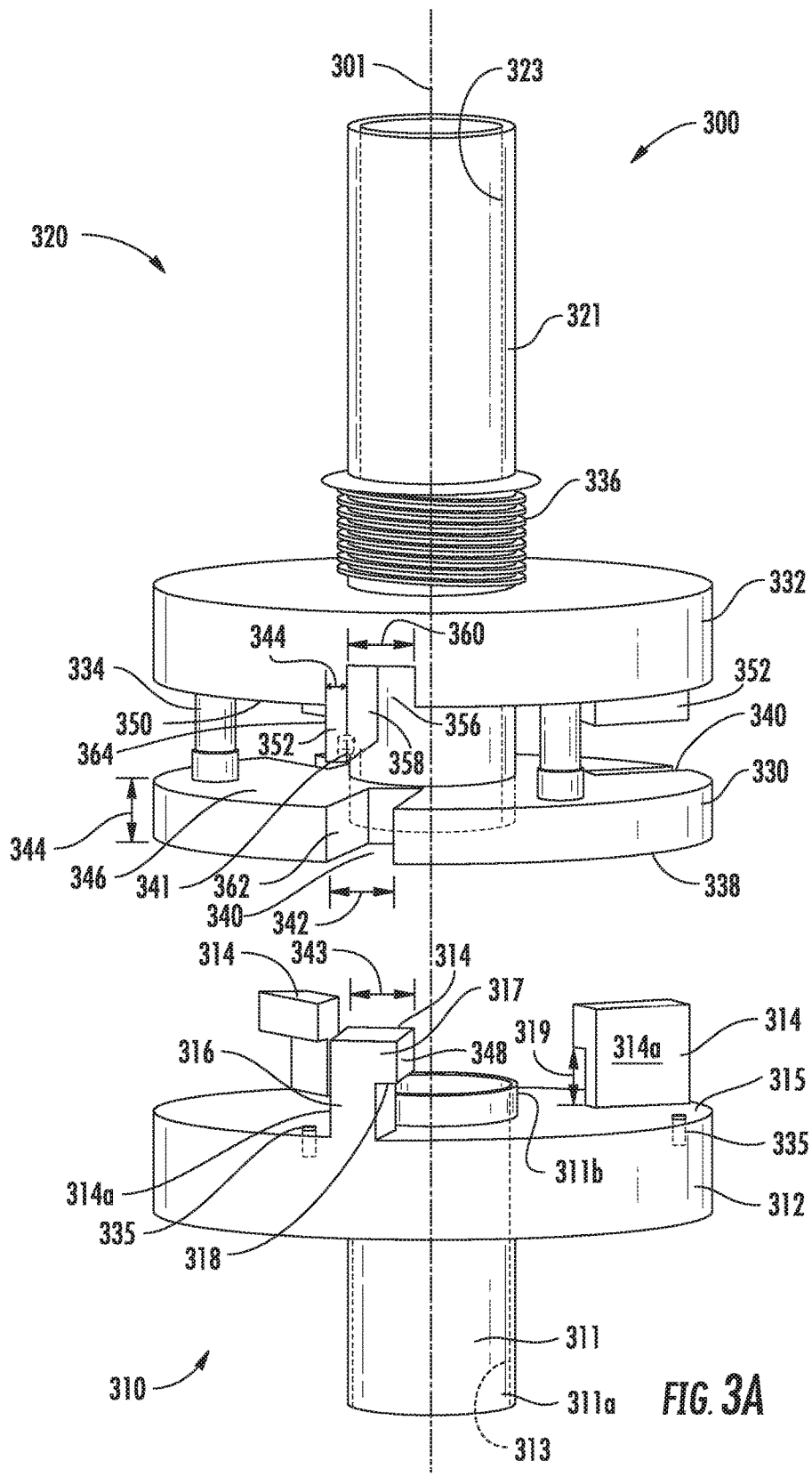
FIG. 3A is a schematic perspective view a combined multi-coupler according to one embodiment of the present disclosure in a disconnection position.

FIG. 3A is a schematic perspective view a combined multi-coupler 300 according to one embodiment of the present disclosure. The combined multi-coupler 300 may be used to connect and disconnect a top drive and a tool. The combined multi-coupler 300 may be used in place of the combined multi-coupler 116 of FIG. 1.

The combined multi-coupler 300 is at a disconnect position in FIG. 3A. The combined multi-coupler 300 may include a drive stem 320 and a tool dock 310. The drive stem 320 may be coupled to a top drive. The tool dock 310 may be connected to a tool or a tool string. The drive stem 320 and the tool dock 310 may be quickly connected and disconnected. When connected, the combined multi-coupler 300 provide a torque transfer mechanism and/or a connection of couples to transfer pressured fluid, data, or another other types of signals between the tool dock 310 and the drive stem 320.

The tool dock 310 may include a shaft 311 for connecting with a tool at a lower end 311a. A central bore 313 may extend through the tool dock 310 along a longitudinal central axis 301. A tool coupling plate 312 may be connected to the shaft 311. The tool coupling plate 312 may be a circular plate extending radially outward from the shaft 311. The tool coupling plate 312 may be fixedly connected to the shaft 311. Alternatively, the tool coupling plate 312 and the shaft 311 may be formed in a unitary body.

One or more interlock keys 314 formed on an upper surface 315 of the tool coupling plate 312. Each interlock key 314 may have a "L" shaped side view. In one embodiment, each interlock key 314 may include a neck portion 316 and a head portion 317. Each interlock key 314 may have a vertical wall 314a on one side. The vertical wall 314a runs through the neck portion 316 and the head portion 317. The neck portion 316 may have a length 319. The head portion 317 may be wider than the neck portion 316 and extends from the neck portion 316 on the opposing side of the vertical wall 314a. In one embodiment, the head portion 317 may have a width 343. The head portion 317 extends from the neck portion 316 forming a shoulder 318 for load bearing.

The tool dock 310 may include one or more couplers 335. In one embodiment, each coupler 335 may be positioned adjacent the interlock key 314. For example, each coupler 335 may be positioned adjacent the vertical wall 314a of the interlock key 314. Similar to the couplers 235, each coupler 335 may be configured to receive hydraulic, pneumatic, electrical, optical, or other types of communication from the drive stem 320. The couplers 335 may have different structures or connect to different components to serve different functions. The interlock keys 314 may have different dimensions or may be arranged asymmetrically to provide an orientation for distinguishing different couplers 335.

The one or more interlock keys 314 may be positioned along an outer edge of the tool coupling plate 312. In one embodiment, the one or more interlock keys 314 may be evenly distributed along the outer edge of the tool coupling plate 312. Alternatively, the one or more interlock keys 314 may be unevenly distributed along the outer edge of the tool coupling plate 312. The uneven distribution may be used to distinguish the couplers 335 during the connection process. In one embodiment, each interlock key 314 may have the same dimension. Alternatively, one or more interlock keys 314 may have a different dimension from others to provide an orientation for distinguishing different couplers 335.

An upper end 311b of the shaft 311 may extend from the upper surface 315 of the tool coupling plate 312. The upper end 311b may form a sealed connection for fluid transfer through the central bore 313 with the drive stem 320.

The drive stem 320 may include a stem 321 and a drive coupling plate 330 joined together. The stem 321 and the drive coupling plate 330 may be joined together or formed as a unitary body. The stem 321 may include a central bore 323. A connection recess (not shown) may form at a lower end of the central bore 323 to make a fluid connection with the upper portion 311b of the shaft 311 of the tool dock 310.

The drive stem 320 further include a securing plate 332 movably coupled to the stem 321. The securing plate 332 may move axially along the direction of the central axis 301. In one embodiment, one or more actuators 334 may be to the securing plate 332 to move the securing plate 332 along the stem 321. In one embodiment, the one or more actuators 334 may be coupled between the drive coupling plate 330 and the securing plate 332. The one or more actuators 334 may move the securing plate 332 relative to the drive coupling plate 330. The one or more actuators 334 may be hydraulic cylinders, or other suitable displacement motors.

In one embodiment, a biasing element 336 may be coupled to the securing plate 332. The biasing element 336 may be used to bias the securing plate 332 towards the drive coupling plate 330. In one embodiment, the biasing element 336 maybe a spring. The biasing element 336 may be disposed between the stem 321 and the securing plate 332.

The drive coupling plate 330 may be a planar plate having an upper surface 346 and a lower surface 338. One or more notches 340 may be formed through the drive coupling plate 330. Each notch 340 may be positioned to receive a corresponding interlock key 314. In one embodiment, each notch 340 may have a width 342 that is wide enough to receive the head portion 317 of the corresponding interlock key 314. In one embodiment, the one or more notches 340 may have the same dimension. Alternatively, at least one notch 340 may have a width different from other notches 340 corresponding to the arrangement of the interlock keys 314. In one embodiment, the one or more notches 340 may be distributed evenly along an outer edge of the drive coupling plate 330. Alternatively, the one or more notches 340 may be unevenly distributed to match the asymmetrical arrangement of the interlock keys 314.

The drive coupling plate 330 may have a thickness 344. The thickness 344 may be substantially similar to the lengths 319 of the neck portion 316 of the interlock keys 314 so that the shoulders 318 of the interlock keys 314 engage with the upper surface 346 of the drive coupling plate 330 when coupled together.

The securing plate 332 may be a circular plate having a planar lower surface 350 facing the upper surface 346 of the drive coupling plate 330. One or more securing keys 352 extend from the lower surface 350. Each securing key 352 may have a side surface 364 and a side surface 358 opposing the side surface 364. Each securing key 352 aligns with a notch 340 so the securing key 352 inserts into the corresponding notch 340. When inserting into the notch 340, the side wall 364 of the securing key 352 is flushed against a side surface 362 in the notch 340.

A recess 356 is formed in the lower surface 350 along the side surface 358 of each securing key 352. The recess 356 may have a width 360 corresponding to the width 343 of the head portion 317 of the corresponding interlock key 314. The recess 356 is deep enough to receive the head portion 317.

In one embodiment, the drive stem 320 may include one or more couplers 341 positioned to connect with the couplers 335 in the tool dock 310. Each coupler 341 may be configured to receive hydraulic, pneumatic, electrical, optical, or other types of communication with the tool dock 310. In one embodiment, the couplers 341 may be disposed in the securing key 352.

FIGS. 3B-3G schematically illustrate a connecting sequence of the combined multi-coupler 300. In FIG. 3B, the drive stem 320 and the tool dock 310 are aligned along the central axis 301. The drive stem 320 and the tool dock 310 may be moved towards each other along the central axis 301 so that the interlock keys 314 are nearly in contact with the lower surface 338 of the drive coupling plate 330. The securing plate 332 is biased against the drive coupling plate 330 by the biasing element 336 so the securing keys 352 are inserted in the notches 340.

In the position shown in FIG. 3B, the drive stem 320 and the tool dock 310 may be rotated relative to each other about the central axis 301 to align the interlock keys 314 with corresponding notches 340. In one embodiment, the drive stem 320 may be rotated by the top drive connected to the stem 321. Alternatively, the tool dock 310 may rotate while the drive stem 320 remains stationary. The alignment of the interlock keys 314 and the notches 340 may be automatically using sensors. Alternatively, the alignment may be achieved by manual operations. The relative rotation stops, when the interlock keys 314 are aligned with the notches 340.

In FIG. 3C, the drive stem 320 and the tool dock 310 may be moved towards each other along the direction of the central axis 301 to slide the interlock keys 314 into the corresponding notches 340. In one embodiment, the drive stem 320 may be pushed down to slide the interlock keys 314 into the notches 340. Alternatively, the tool dock 310 may be pushed up against the drive stem 320. As the head portion 317 of the interlock key 314 enters the notch 340, the interlock key 314 pushes the securing key 352 out of the notch 340 lifting the securing plate 332 from the drive coupling plate 330.

The relative movement between the drive stem 320 and the tool dock 310 stops when the lower surface 338 of the drive coupling plate 330 contacts the upper surface 315 of the tool coupling plate 312 while the securing keys 352 are cleared out of the notches 340 and the shoulders 318 of the interlock keys 314 are above the upper surface 346 of the drive coupling plate 330. When the drive coupling plate 330 contacts the tool coupling plate 312, the upper end 311b of the shaft 311 couples with the lower end of the stem 321 forming a fluid connection between the central bores 313 and 323.

In FIG. 3D, after the shoulders 318 are moved above the upper surface 346 of the drive coupling plate 330, the tool dock 310 and the drive stem 320 may be rotated relative to each other about the central axis 301 to interlock the interlock keys 314 with the drive coupling plate 330. The relative rotation may be performed by rotating the drive stem 320 while the tool dock 310 remains stationary. Alternatively, the tool dock 310 may be rotated while the drive stem 320 remains stationary. The relative rotation stops when the neck portions 316 of the interlock keys 314 are flush against side surfaces of the notches 340.

When the neck portions 316 are flush against side surfaces of the notches 340, the head portions 317 of the interlock keys 314 are cleared from the securing keys 352. With the interlock keys 314 moving out of the way, the securing plate 332 moves towards the drive coupling plate 330 under the force of the biasing element 336. The securing keys 352 fill in the gap in the notches 340 against the interlock keys 314 as shown in FIG. 3E.

As the securing keys 352 return to the native position the couplers 335 are connected with the couplers 341 establishing hydraulic, pneumatic, electric, optical, or other types of communications between the drive stem 320 and the tool dock 310.

FIG. 3F schematically illustrates the combined multi-coupler 300 in the connected position. The interlock keys 314 and the securing keys 352 lock the drive coupling plate 330 to the tool coupling plate 312 to transfer axial loads and the torsional loads between the tool dock 310 and the drive stem 320 as shown in FIG. 3G.

FIG. 3H schematically illustrates a disconnect sequence of the combined multi-coupler 300. To disconnect the tool dock 310 from the drive stem 320, the securing plate 332 may be first lifted from the drive coupling plate 330. In one embodiment, the securing plate 332 may be lifted with the actuators 334. The actuators 334 may push the securing plate 332 against the biasing element 336 to lift the securing plate 332 from the drive coupling plate 330. When the securing plate 332 is lifted up so that the securing keys 352 are above the interlock keys 314, the drive stem 320 and the tool dock 310 may be rotated relative to each other about the central axis 301 until the shoulders 318 disengage the upper surface 346 of the drive coupling plate 330. The drive stem 320 and the tool dock 310 may then be moved away along the central axis 301 to slide the interlock keys 314 out of the drive coupling plate 330, thus, disconnecting the tool dock 310 from the drive stem 320.

Combined Multi-Coupler with Key and Lock Structure

Figure 4A:
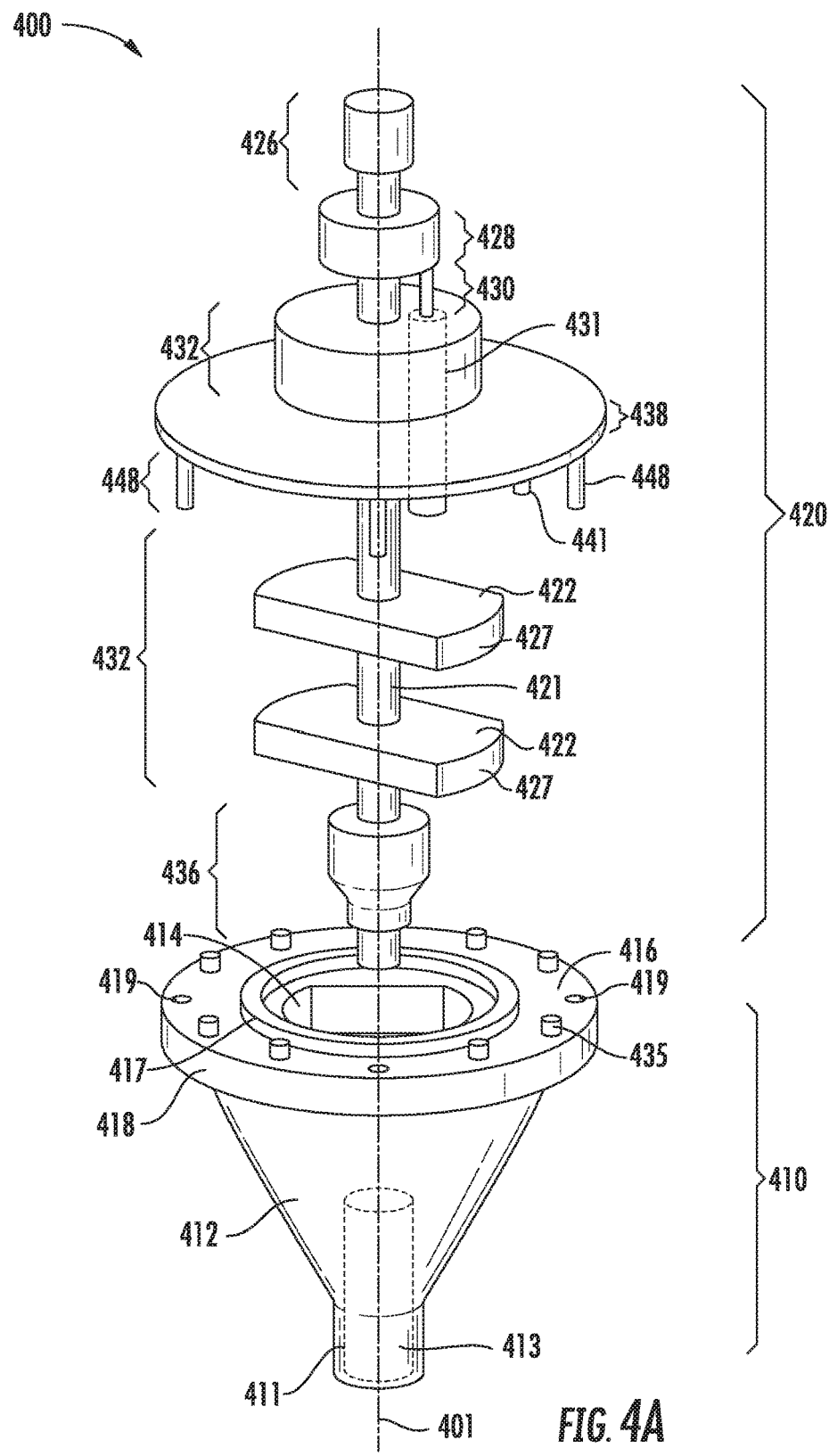
FIG. 4A is a schematic perspective view a combined multi-coupler according to one embodiment of the present disclosure in a disconnection position.

FIG. 4A is a schematic perspective view of a combined multi-coupler 400 according to one embodiment of the present disclosure. The combined multi-coupler 400 may be used to connect and disconnect a top drive and a tool. The combined multi-coupler 400 may be used in place of the combined multi-coupler 116 of FIG. 1.

The combined multi-coupler 400 is at a disconnect position in FIG. 4A. The combined multi-coupler 400 may include a drive stem 420 and a tool dock 410. The drive stem 420 may be coupled to a top drive. The tool dock 410 may be connected to a tool or a tool string. The drive stem 420 and the tool dock 410 may be quickly connected and disconnected. When connected, the combined multi-coupler 400 provide a torque transfer mechanism and/or a connection of couplers to transfer pressured fluid, data, or other types of signals between the tool dock 410 and the drive stem 420.

The tool dock 410 may include a shaft 411 for connecting with a tool. A central bore 413 may extend through the tool dock 410 along a central axis 401. The tool dock 410 may include a housing 412 and a flange 418 attached to the shaft 411. A key cavity 414 may be formed in the flange 418 and the housing 412 for receiving the drive stem 420.

The tool dock 410 may include one or more couplers 435. The one or more couplers 435 may be disposed on an upper surface 416 of the flange 418. In one embodiment, the one or more couplers 435 may be disposed along the outer diameter of the upper surface 416. Similar to the couplers 235, each coupler 435 may be configured to receive hydraulic, pneumatic, electrical, optical communication from the drive stem 420. The couplers 435 may have different structures or connect to different components to serve different functions.

One or more alignment notches 419 may be formed in the upper surface 416 for aligning with the drive stem 420. In one embodiment, the one or more alignment notches 419 may be formed on the outer diameter of the upper surface 416 of the flange 418.

The drive stem 420 may include key structures matching the shape of the key cavity 414 in the tool dock 410 to couple with the tool dock 410. FIG. 4B is a schematic sectional side view of the drive stem 420. FIG. 4C is a schematic bottom view of the drive stem 420. The drive stem 420 may include a stem 421. The stem 421 may have a central bore 453 formed therethrough along the central axis 401. An upper end of the stem 421 is configured to connect with a top drive. A lower end of the stem 421 is configured to insert into the tool dock 410. In the embodiment shown in FIG. 4A, a rotational drive unit 426 is attached to the stem 421 to rotate the stem 421 about the central axis 401. In one embodiment, a hydraulic swivel 428 may be attached to the drive stem 420 to transfer hydraulic power.

In one embodiment, the drive stem 420 may include a lock pin 431. The lock pin 431 may be disposed parallel to the stem 421. The lock pin 431 may move vertically along the direction of the central axis 401. In one embodiment, an actuator 430 may be attached to the lock pin 431 to lift and lower the lock pin 431. In one embodiment, the actuator 430 may be a hydraulic piston. The lock pin 431 may be lowered through the coupling plate 438 into the key cavity 414 to lock retaining ring 434 the drive stem 420 and the tool dock 410 together.

The drive stem 420 may include a coupling plate 438. The coupling plate 438 may be movably disposed on the drive stem 420. The coupling plate 438 may move axially along the stem 421. A biasing element 432 may be coupled to the coupling plate 438 to bias the coupling plate 438 towards the lower end of the stem 421. In one embodiment, the biasing element 432 may be a spring.

The drive stem 420 may include a retaining ring 434 disposed on the stem 421. The retaining ring 434 may torsionally lock the coupling plate 438 to the stem 421 when the coupling plate 438 is biased against the retaining ring 434 by the biasing element 432. The coupling plate 438 may rotate about the central axis 401 relative to the stem 421 when pushed away from the retaining ring 434.

The drive stem 420 may include one or more couplers 441 positioned to connect with the couplers 435 in the tool dock 410. Each coupler 441 may be configured to receive hydraulic, pneumatic, electrical, or optical communication with the tool dock 410. In one embodiment, the couplers 441 may be disposed on a lower surface 439 of the coupling plate 438. In one embodiment, the one or more couplers 441 may be disposed along an outer diameter of the lower surface 439.

One or more alignment pins 448 may be disposed on the coupling plate 438 to align the drive stem 420 with the coupling plate 438 for connection. The one or more alignment pins 448 may be arranged to match the alignment notch 419 on the flange 418 of the tool dock 410.

One or more lugs 422 may be fixedly attached to the stem 421. The one or more lugs 422 may be inserted into the cavity 414 in the tool dock 410 to form connections for transferring axial loads and torsional loads. Even though two lugs are shown in FIG. 4A, less or more lugs may be used. The lugs 422 may be fixedly attached to the stem 421 or formed with the stem 421 as a unitary body.

Each lug 422 may have an elongated body extending from the stem 421 along a direction perpendicular to the central axis 401. In one embodiment, the elongated body of each lug 422 may be asymmetric placed relative to the central axis 401. For example, each lug 422 may have a longer portion on one side of the central axis 401 and a shorter portion on the other side of the central axis 401. In one embodiment, the one or more lugs 422 may be arranged along the same orientation. Each lug 422 may have a planar upper surface 423 and a planar lower surface 424 for transferring axial loads. In one embodiment, each lug 422 may have planar sides 429 and curved ends 427.

A sealing element 425 may be disposed around a lower end of the stem 421. The sealing element 425 may be used to form a sealed fluid connection between the central bores 423, 413 when the drive stem 420 is connected to the tool dock 410.

In one embodiment, the drive stem 420 may include a sheath assembly 436 disposed around the lower end of the stem 421. The sheath assembly 436 is configured to protect a sealing surface and/or the sealing element 425 on the stem 421 from exterior environment. The sheath assembly 436 may include a sleeve 437 movably disposed over the stem 421. A biasing element 433 is coupled to the sleeve 437 to bias the sleeve 437 downward so the sleeve 437 covers the sealing element 425. In one embodiment, the biasing element 433 may be a spring. The sleeve 437 may include a shoulder 450. At a connection position, the sleeve 437 is pushed upwards at the shoulder 450 to expose the sealing element 425.

Figure 4F:
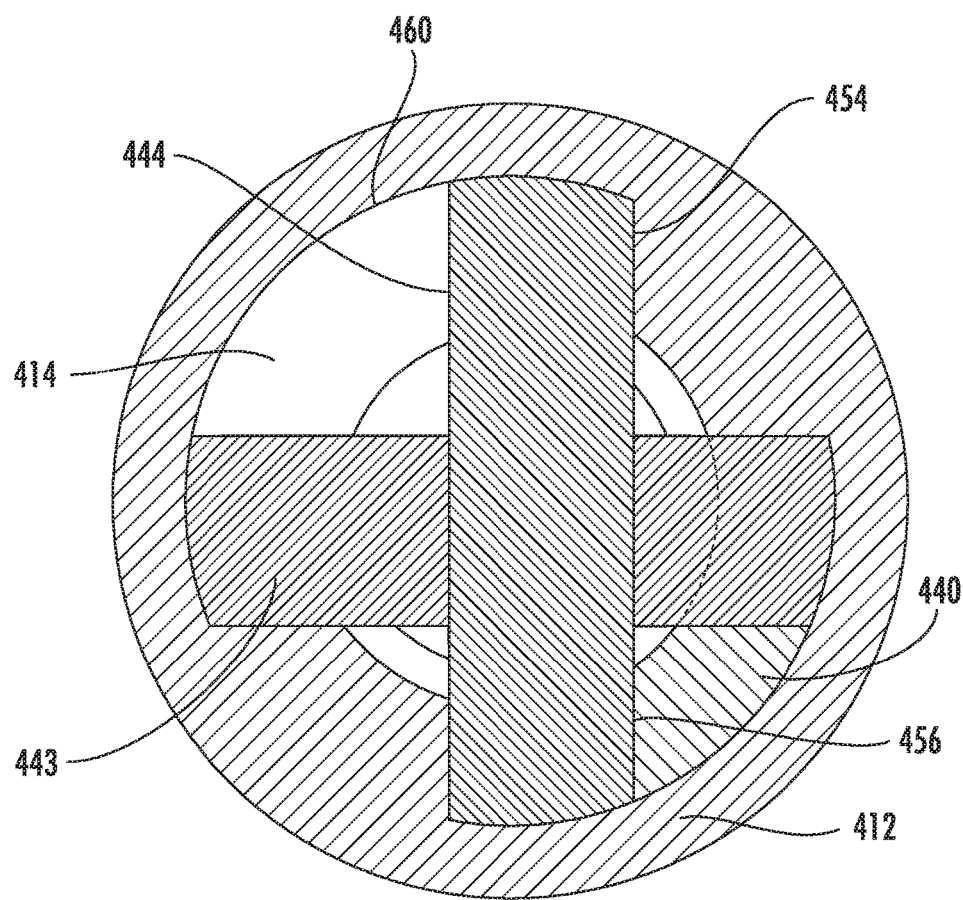
FIG. 4F is a schematic cross sectional view of the tool dock of FIG. 4D.

FIG. 4D is a schematic sectional side view of the tool dock 410 according to one embodiment of the present disclosure. FIG. 4E is a schematic top view of the tool dock 410 of FIG. 4D. FIG. 4F is a schematic cross sectional view of the tool dock 410. FIGS. 4D-4F illustrate details of the key cavity 414 in the tool dock 410. The key cavity 414 may include an entrance key hole 442. The entrance key hole 442 allows the lugs 422 to be inserted into the key cavity 414. The key cavity 414 includes one or more sockets 460, each configured to receive one lug 422. The entrance key hole 442 extends from the upper surface 416 of the flange 418 through all the sockets 460. The key cavity 414 further includes a lock pin entrance 440 for receiving the lock pin 431 of the drive stem 420. The lock pin entrance 440 extends from the upper surface 416 of the flange 418 to all the sockets 460.

In one embodiment, the entrance key hole 442 may be asymmetrical about the central axis 401 to accommodate the asymmetrical lugs 422. The entrance key hole 442 may have a longer portion on one side of the central axis 401 and a short portion on the other side of the central axis 401. In one embodiment, the lock pin entrance 440 may be formed at the shorter portion of the entrance key hole 442.

FIG. 4F schematically illustrates a cross sectional view of the socket 460. In each socket 460, the lug 422 may turn from the entrance position 443 confined in the entrance key hole 442 into a locked position 444. In one embodiment, the lug 422 may rotate about 90° about the central axis 401 to move from the entrance position 443 to the locked position 444. At the locked position, the lug 422 engages with shoulders 415 and 452 in the socket 460 to transfer axial loads. When the lock pin 431 is inserted into each socket 460 through the lock pin entrance 440, the lug 422 is rotationally locked in the locked position 444, thus, torsionally coupled to the tool dock 410. Torsional loads may be transferred between the lug 422 and the tool dock 410 at torque shoulders 454, 456.

The tool dock 410 may include an end stop 417 extending from the upper surface 416 of the flange 418. The end stop 417 may be a ring or other protrusions that is higher than the couplers 435. The end stop 417 stops the drive stem 420 when the couplers 435 and 441 are connected.

In one embodiment, the key cavity 414 may include a shoulder 458. The shoulder 458 may interact with the shoulder 450 in the sheath assembly 436 to push back the sleeve 437 and reveal the sealing element 425.

Figures 4G, 4H:
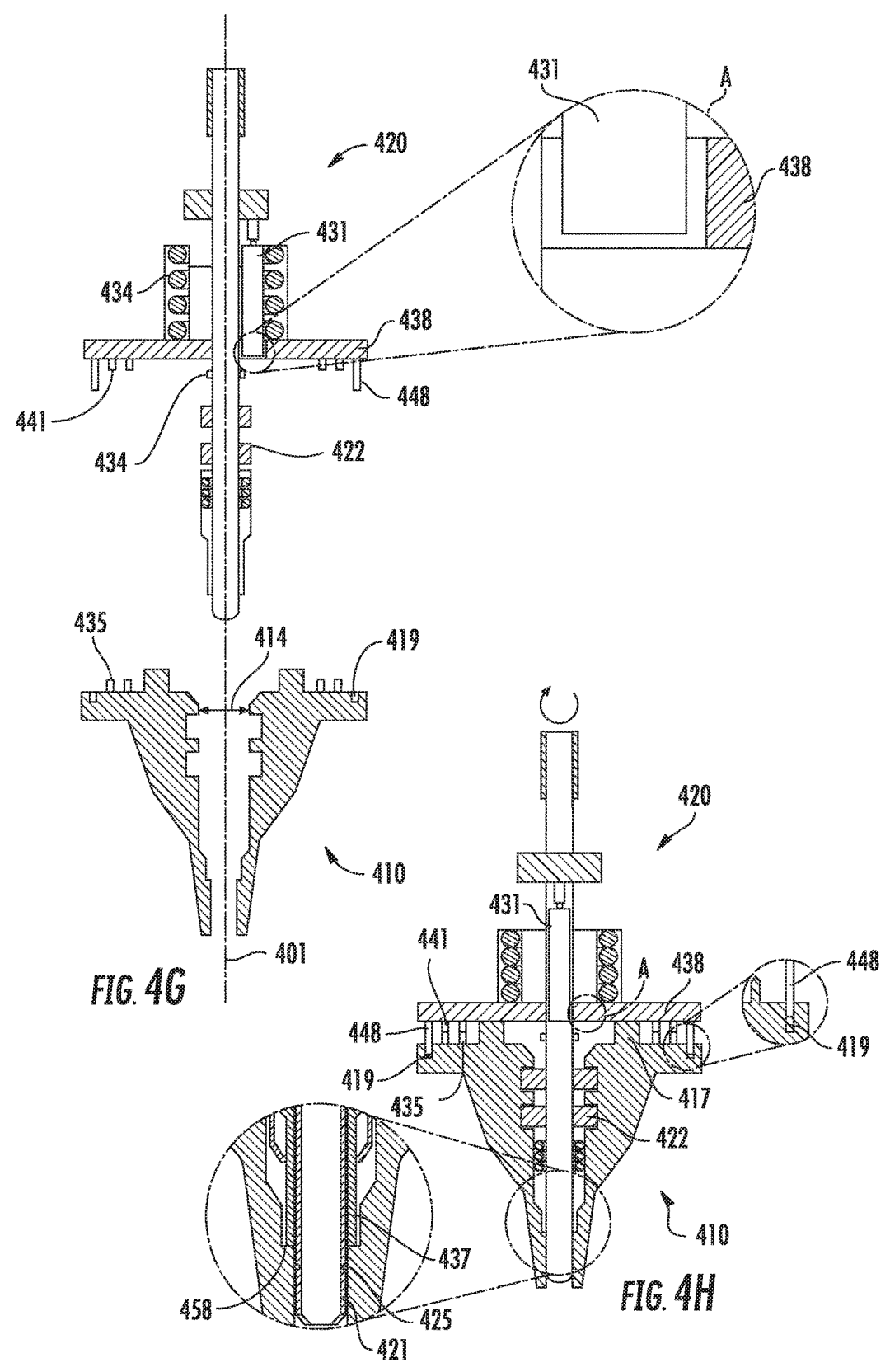

FIGS. 4G-4K schematically illustrate a connecting sequence of the combined multi-coupler 400. In FIG. 4G, the drive stem 420 and the tool dock 410 are positioned along the same longitudinal axis for connection. The drive stem 420 and/or the tool dock 410 may rotate about the central axis 401 to align the one or more alignment pins 448 with the corresponding one or more alignment notches 419. At this position, the lock pin 431 is lifted above the coupling plate 438. The coupling plate 438 is biased towards the retaining ring 434.

In FIG. 4H, the tool dock 410 and the drive stem 420 are moved towards each other along the central axis 401. The alignment pins 448 are inserted into the alignment notches 419. The couplers 435 are aligned with the corresponding couplers 441. The lugs 422 are inserted into the key cavity 414. The shoulder 458 pushes the sleeve 437 to reveal the sealing element 425.

Figure 4K:
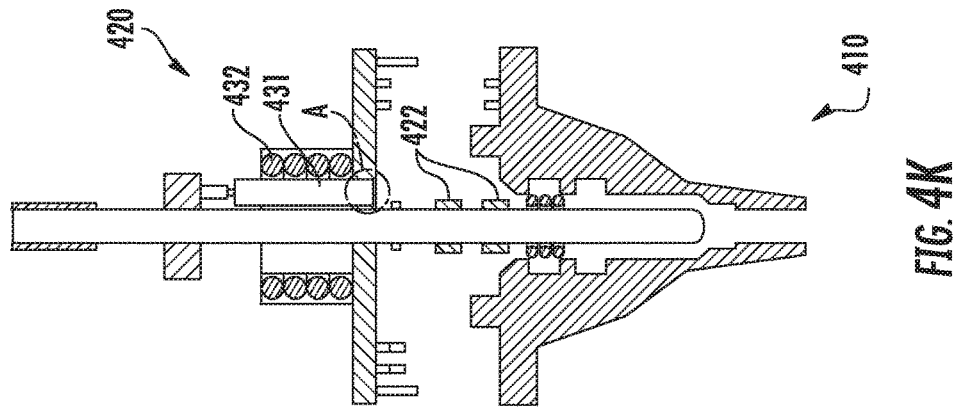
Figure 4J:
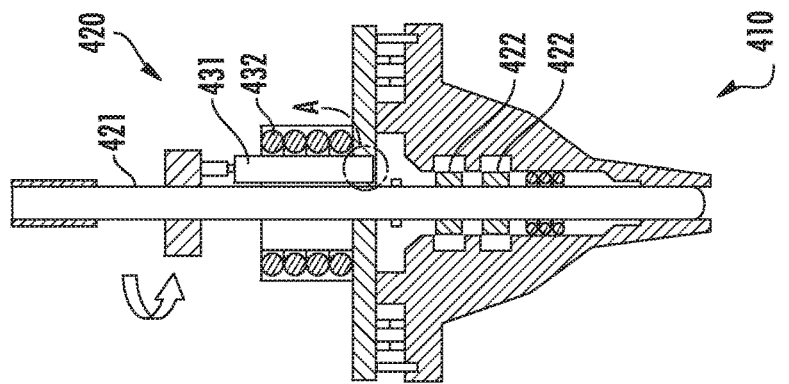
Figure 4I:
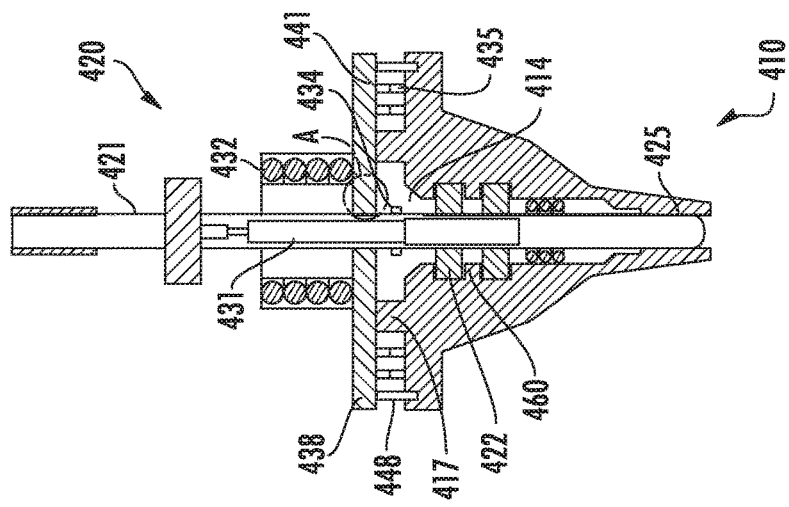

In FIG. 4I, the couplers 435, 441 are connected forming hydraulic, electric, pneumatic, optical, or other types of communications between the tool dock 410 and the drive stem 420. Upon the connections between the couplers 435 and 441, the coupling plate 438 is stopped by the end stop 417 and disengaged from the retaining ring 434. The stem 421 and the lugs 422 may further enter into the key cavity 414 until the lugs 422 reach the corresponding sockets 460.

In FIG. 4J, the stem 421 and the lugs 422 may be rotated relative to the tool dock 410 so that the lugs 422 rotate from the entrance position to the locked position. In one embodiment, the stem 421 may rotate 90° about the central axis 401 to move the lugs 422 into the locked position.

In FIG. 4K, the lock pin 431 is inserted into the key cavity 414 to lock the lugs 422 in the locked position to complete the connection between the tool dock 410 and the drive stem 420.

Figure 5A:
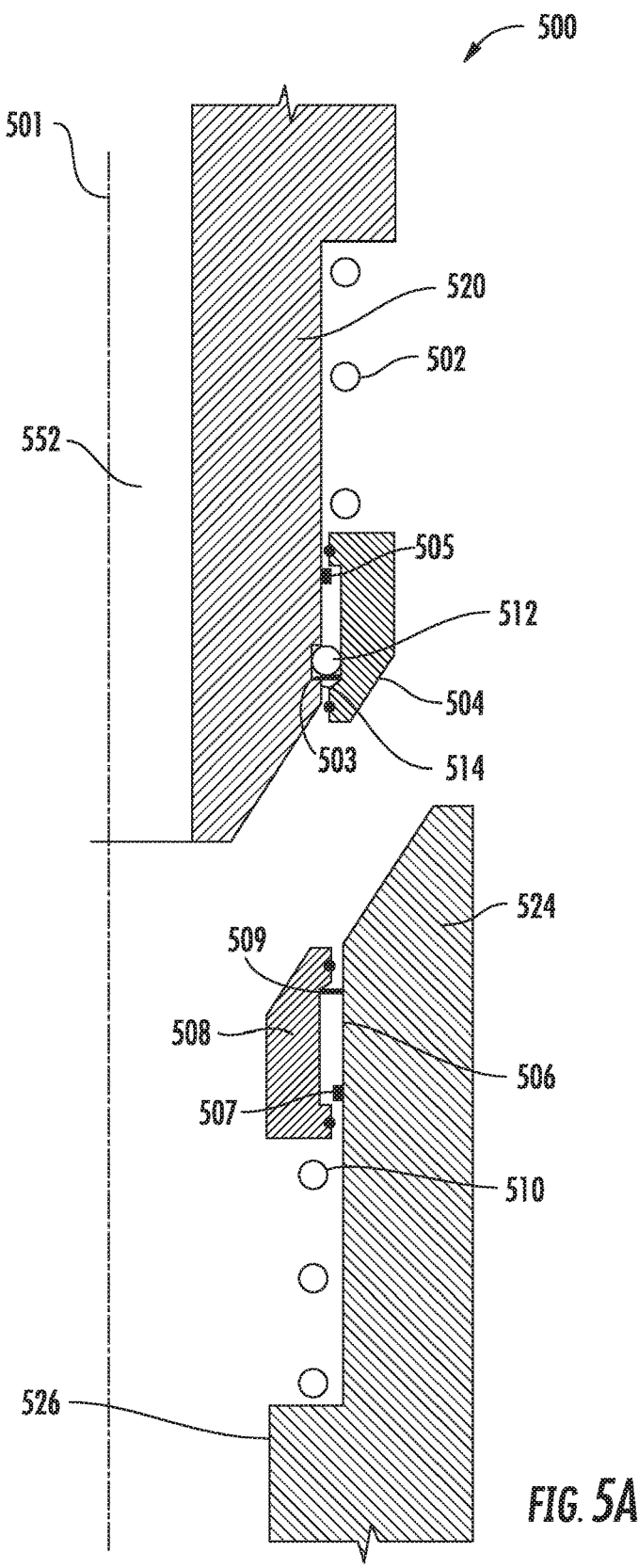
FIG. 5A schematically illustrates a seal and seal surface protection assembly according to one embodiment of the present disclosure.
Figure 5B:
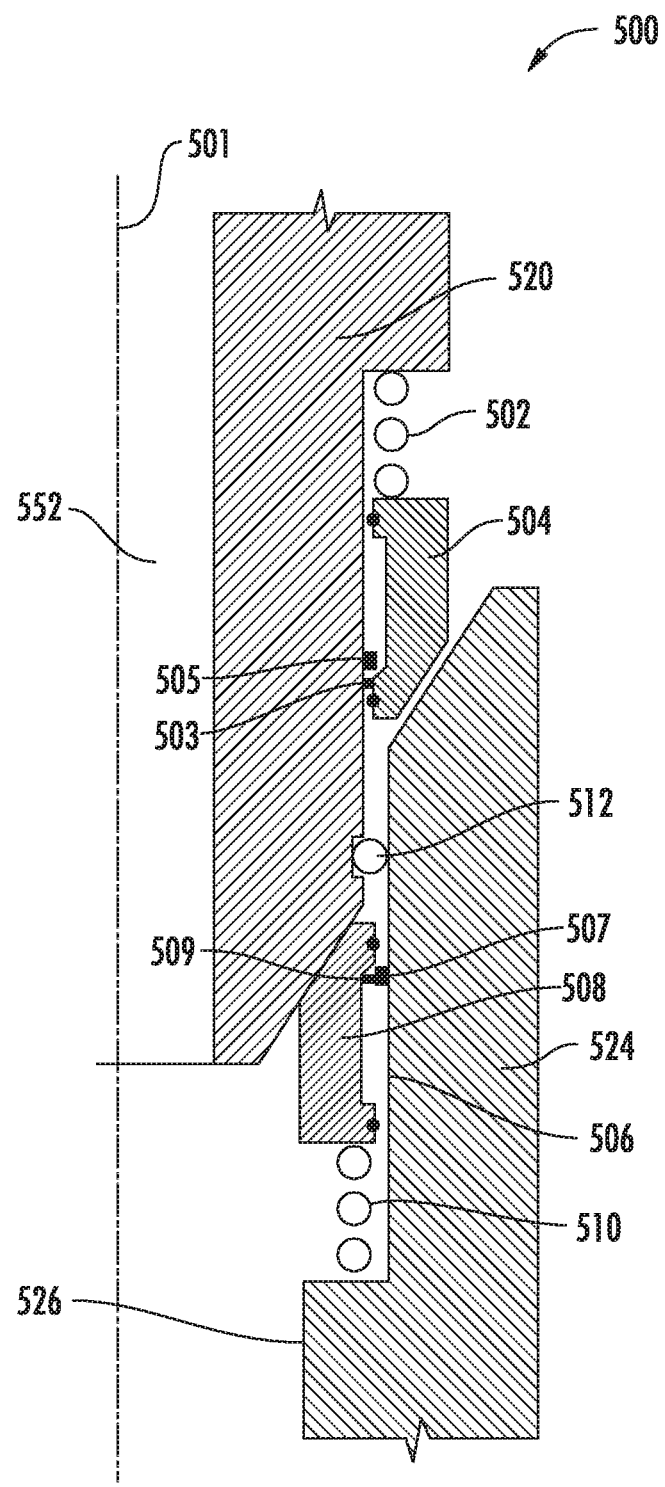
FIG. 5B schematically illustrates the seal and seal surface protection assembly in a sealed position.

FIGS. 5A-5B schematically illustrate a seal and seal surface protection assembly 500 according to one embodiment of the present disclosure. The seal and seal surface protection assembly 500 may be used for connection between the shaft 411 and the stem 421 in the combined multi-coupler 400, or any suitable tubular connections.

FIG. 5A schematically illustrates the seal and seal surface protection assembly 500 in a protected position. A first tubular 520 may have a central bore 522. A seal element 512 may be disposed on an outer surface 514 of the first tubular 520. A protective sleeve 504 may be movably disposed over the seal element 512. A biasing element 502 may be coupled to the protective sleeve 504 to bias the protective sleeve 504 in the protected position. A retaining ring 505 may be attached to the first tubular 520 to prevent the protective sleeve 504 from falling off. In one embodiment, a brush 503 may be attached to the protective sleeve 504 and pressed against an outer surface of the first tubular 520. The brush 503 brushes against the seal element 512 while moving with the protective sleeve 504 to keep the seal element 512 clean.

A second tubular 524 may have a central bore 526 and a seal surface 506 facing the central bore 526. A protective sleeve 508 may be movably disposed over the seal surface 506. A biasing element 510 may be coupled to the protective sleeve 508 at the protected position. A retaining ring 507 may be attached to the second tubular 524 to prevent the protective sleeve 508 from falling off. In one embodiment, a brush 509 may be attached to the protective sleeve 508 and pressed against an outer surface of the second tubular 524. The brush 509 brushes against the seal surface 506 while moving with the protective sleeve 508 to keep the seal surface 506 clean.

FIG. 5B schematically illustrates the seal and seal surface protection assembly 500 in a sealed position. To form a sealed connection between the central bores 522, 526, the first tubular 520 is inserted into the central bore 526 of the second tubular 524. The protective sleeve 504 is pushed back by the second tubular 524 to reveal the seal element 512. The protective sleeve 508 is pushed back by the first tubular 520 to reveal the seal surface 506. A sealed connection is formed between the seal element 512 and the seal surface 506.

Even though one protective sleeve 504 and one protective sleeve 508 are shown in FIGS. 5A and 5B, two or more protective sleeves 504 and two or more protective sleeves 508 may be used.

Embodiments of the present disclosure provide a combined multi-coupler for a top drive. The combined multi-coupler includes a housing having a connection recess, wherein the connection recess has a bayonet profile, and one or more tapered load shoulders are formed in the connection recess, a locking plate movably disposed in the housing; and one or more couplers disposed in the locking plate.

In some embodiments, the combined multi-coupler further includes one or more actuators to move the locking plate within the housing along an axial direction.

In some embodiments, the locking plate includes a plate and one or more locking blocks extending from the plate, wherein the locking blocks are shaped to fill in the bayonet profile between the tapered load shoulders.

In some embodiments, the combined multi-coupler further includes one or more locking elements disposed in the locking plate, wherein the locking elements is movable between a retracted position and a locked position, and the locking elements extend from the locking plate into the connection recess in the locked position.

In some embodiments, the combined multi-coupler further includes one or more locking actuators to move the one or more locking elements between the retracted position and the locked position, wherein in the locked position, the locking elements couple the locking plate to a tool dock inserted in the housing such that the locking plate moves axially to provide thread compensation between the housing and the tool.

In some embodiments, the combined multi-coupler further includes a tool dock for connecting to a tool, wherein the tool dock has one or more tapered load shoulders formed on an outer surface, and one or more couplers formed on an upper surface.

In some embodiments, the tool dock includes a bayonet profile matching the bayonet profile in the housing.

Some embodiments of the present disclosure provide a combined multi-coupler. The combined multi-coupler includes a stem for connecting to the top drive, a first coupling plate fixed attached to the stem, wherein the first coupling plate has one or more notches formed therethrough, a securing plate movable relative to the first coupling plate, wherein the securing plate has one or more securing keys aligned with the one or more notches in the first coupling plate, and each securing key is movable between a locked position in the corresponding notch and an unlocked position out of the corresponding notch.

In some embodiments, the combined multi-coupler further includes a biasing element coupled to the securing plate to bias the securing plate to push the securing keys into the notches.

In some embodiments, the combined multi-coupler further includes one or more actuator coupled to the securing plate to move the securing keys out of the notches.

In some embodiments, the combined multi-coupler further includes one or more couplers disposed in the securing plate.

In some embodiments, the combined multi-coupler further includes a second coupling plate adapted to connect to a tool, wherein the second coupling plate has one or more interlock keys, and each interlock key is alignable with a corresponding notch in the first coupling plate.

In some embodiments, each interlock key comprises a neck portion and a head portion, and a width of the head portion corresponds to a width of the corresponding notch.

In some embodiments, the combined multi-coupler further includes one or more couplers disposed in the second coupling plate.

Some embodiments of the present disclosure provide a combined multi-coupler for a top drive. The combined-multi-coupler includes a stem for connecting to the top drive, one or more lugs fixedly attached to the stem, a coupling plate movably attached to the stem, and one or more couplers disposed on the coupling plate.

In some embodiments, the combined multi-coupler further includes a lock pin movably coupled to the stem, wherein the lock pin is movably along an axial direction of the stem.

In some embodiments, the combined multi-coupler further includes one or more alignment pins disposed on the coupling plate.

In some embodiments, the combined multi-coupler further includes a sheath assembly disposed over a lower end of the stem.

In some embodiments, each one of the one or more lug has an elongated body asymmetrically extending from the stem.

In some embodiments, the combined multi-coupler further includes a tool dock for connecting to a tool, the tool dock includes a dock body having a key cavity for receiving the stem and the one or more lugs, and one or more couplers disposed on the dock body.

In some embodiments, the key cavity includes an entrance key hole to allow the lugs to be inserted into the key cavity, and one or more sockets configured to receive the one or more lugs, wherein each socket includes an entrance area for receiving the lug during insertion and a locked area for receiving the lug when the lug rotates from an entrance position to a locked position.

While the foregoing is directed to embodiments of the present disclosure, other and further embodiments of the disclosure may be devised without departing from the basic scope thereof, and the scope thereof is determined by the claims that follow.

The invention claimed is:

1. A combined multi-coupler for a top drive, comprising:
    a housing having a cavity, wherein the cavity has a bayonet profile, and wherein the housing includes one or more tapered load shoulders;
    a locking plate movably disposed in the housing;
    one or more actuators to move the locking plate within the housing along an axial direction;
    one or more locking elements disposed in the locking plate, wherein the locking elements are movable between a retracted position and a locked position, and the locking elements extend from the locking plate into the cavity in the locked position;
    one or more locking actuators to move the one or more locking elements between the retracted position and the locked position, wherein in the locked position, the locking elements couple the locking plate to a tool dock inserted in the housing such that the locking plate moves axially to provide thread compensation between the housing and a tool; and
    one or more couplers disposed in the locking plate.

2. The combined multi-coupler of claim 1, wherein the locking plate comprises:
    a plate; and
    one or more locking blocks extending from the plate, wherein the locking blocks are shaped to fill in the bayonet profile between the tapered load shoulders.

3. The combined multi-coupler of claim 1, further comprising the tool dock for connecting to the tool, wherein the tool dock has one or more tapered load shoulders formed on an outer surface, and one or more couplers formed on an upper surface.

4. The combined multi-coupler of claim 3, wherein the tool dock includes a bayonet profile matching the bayonet profile in the housing.

5. A combined multi-coupler for a top drive, comprising:
a housing having a cavity, wherein the cavity has a bayonet profile, and wherein the housing includes one or more tapered load shoulders;
a locking plate movably disposed in the housing;
one or more locking elements disposed in the locking plate, wherein the locking elements are movable between a retracted position and a locked position, and the locking elements extend from the locking plate into the cavity in the locked position;
one or more actuators to move the locking plate within the housing along an axial direction;
a tool dock inserted in the housing, wherein the tool dock has one or more tapered load shoulders formed on an outer surface, and one or more couplers formed on an upper surface; and
one or more locking actuators to move the one or more locking elements between the retracted position and the locked position, wherein in the locked position, the one or more locking elements couple the locking plate to the tool dock such that the axial movement of the locking plate provides compensation between the housing and the tool dock.

6. The combined multi-coupler of claim 5, wherein the one or more couplers are axially movable.

7. The combined multi-coupler of claim 5, wherein the housing is rotatable relative to the top drive.

8. The combined multi-coupler of claim 5, wherein the locking plate comprises:
a plate; and
one or more locking blocks extending from the plate, wherein the locking blocks are shaped to fill in the bayonet profile between the tapered load shoulders.

9. The combined multi-coupler of claim 5, wherein the one or more couplers are radially movable.

10. The combined multi-coupler of claim 9, wherein the one or more couplers are axially movable.

11. A combined multi-coupler for a top drive, comprising:
a housing having a cavity, wherein the cavity has a bayonet profile, and wherein the housing includes one or more tapered load shoulders;
a locking plate movably disposed in the housing, wherein the locking plate comprises:
a plate; and
one or more locking blocks extending from the plate, wherein the locking blocks are shaped to fill in the bayonet profile between the tapered load shoulders;
one or more actuators to move the locking plate within the housing along an axial direction; and
one or more couplers disposed in the locking plate.

12. The combined multi-coupler of claim 11, further comprising a tool dock configured to be inserted into the cavity, wherein the tool dock includes a recess for each locking element, wherein each locking element is at least partially disposed in the corresponding recess when in the locked position.

13. The combined multi-coupler of claim 11, wherein the coupler is axially movable.

14. The combined multi-coupler of claim 11, wherein the housing is rotatable relative to the top drive.

15. The combined multi-coupler of claim 11, further comprising:
one or more locking elements disposed in the locking plate, wherein the locking elements are movable between a retracted position and a locked position, and the locking elements extend from the locking plate into the cavity in the locked position.

16. The combined multi-coupler of claim 15, wherein the housing is rotatable relative to the tool dock.

17. The combined multi-coupler of claim 15, further comprising one or more locking actuators to move the one or more locking elements between the retracted position and the locked position, wherein in the locked position, the one or more locking elements couple the locking plate to a tool dock inserted in the housing such that the axial movement of the locking plate provides compensation between the housing and the tool dock.

18. The combined multi-coupler of claim 15, wherein the one or more locking elements couple the locking plate to a tool dock, wherein the one or more actuators are configured to lift the locking plate and tool dock relative to the housing in the axial direction.

19. The combined multi-coupler of claim 11, wherein the coupler is radially movable.

20. The combined multi-coupler of claim 19, wherein the coupler is axially movable.

* * * * *